United States Patent
Park et al.

(10) Patent No.: US 10,698,524 B2
(45) Date of Patent: Jun. 30, 2020

(54) TOUCH SCREEN DEVICE, INPUT DEVICE, AND CONTROL METHOD THEREOF AND METHOD THEREOF

(71) Applicant: Samsung Electronics Co., Ltd., Suwon-si, Gyeonggi-do (KR)

(72) Inventors: Sung-soo Park, Suwon-si (KR); Byung-hoon Kang, Suwon-si (KR); Gwan-hyung Kim, Suwon-si (KR); Byung-jik Kim, Seongnam-si (KR); Hui-jun Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 124 days.

(21) Appl. No.: 15/437,972

(22) Filed: Feb. 21, 2017

(65) Prior Publication Data

US 2017/0308223 A1 Oct. 26, 2017

(30) Foreign Application Priority Data

Apr. 22, 2016 (KR) .................. 10-2016-0049491

(51) Int. Cl.
*G06F 3/041* (2006.01)
*G06F 3/038* (2013.01)
(Continued)

(52) U.S. Cl.
CPC ............ *G06F 3/0416* (2013.01); *G06F 3/038* (2013.01); *G06F 3/03545* (2013.01); *G06F 3/044* (2013.01); *G06F 2203/04101* (2013.01)

(58) Field of Classification Search
CPC .... G06F 3/0416; G06F 3/038; G06F 3/03545; G06F 3/044; G06F 2203/04101
See application file for complete search history.

(56) References Cited

U.S. PATENT DOCUMENTS 6,005,555 A 12/1999 Katsurahira et al.
6,930,670 B2 8/2005 Chao et al.
(Continued)

FOREIGN PATENT DOCUMENTS

JP 10-171583 A 6/1998
JP 2012-22543 A 2/2012
(Continued)

OTHER PUBLICATIONS

European Search Report dated Dec. 19, 2018, issued in European Patent Application No. 17786073.1.
(Continued)

*Primary Examiner* — Nitin Patel
*Assistant Examiner* — Amy Onyekaba
(74) *Attorney, Agent, or Firm* — Jefferson IP Law, LLP

(57) ABSTRACT

A touch screen device, an input device, and a control method thereof are provided. The touch screen device includes a channel electrode configured to receive a signal from an input device, a driver circuit configured to apply a drive signal to the channel electrode, a receiver circuit configured to receive the signal from the channel electrode, and a processor configured to control the driver to transmit an input device identification information to the input device such that, when a signal transmitted from the input device is received through the receiver circuit, based on a frequency of the received signal or a pattern of the received signal, the processor determines if the received signal is associated with the input device identification information transmitted to the input device. Accordingly, a touch screen device capable of touch inputting with respect to a plurality of input devices can be provided.

24 Claims, 14 Drawing Sheets

(51) Int. Cl.
*G06F 3/0354* (2013.01)
*G06F 3/044* (2006.01)

(56) References Cited

U.S. PATENT DOCUMENTS

| | | | |
|---|---|---|---|
| 8,482,539 B2 | 7/2013 | Ogawa et al. | |
| 8,482,545 B2* | 7/2013 | King-Smith | G06F 3/03545 345/174 |
| 8,878,823 B1* | 11/2014 | Kremin | G06F 3/03545 345/179 |
| 9,081,437 B2 | 7/2015 | Oda et al. | |
| 9,213,424 B1* | 12/2015 | Dunn | G06F 3/03545 |
| 9,213,455 B2* | 12/2015 | Ih | G06F 3/044 |
| 9,250,721 B2* | 2/2016 | Mkrtchyan | G06F 3/041 |
| 9,310,943 B1* | 4/2016 | Omelchuk | G06F 3/044 |
| 9,632,598 B1* | 4/2017 | Sundara-Rajan | G06F 3/0383 |
| 10,379,666 B2* | 8/2019 | Park | G06F 3/03545 |
| 10,379,694 B2* | 8/2019 | Park | G09G 5/003 |
| 2008/0238885 A1* | 10/2008 | Zachut | G06F 3/046 345/174 |
| 2009/0078476 A1* | 3/2009 | Rimon | G06F 3/03545 178/18.03 |
| 2009/0278794 A1* | 11/2009 | McReynolds | G06F 3/0421 345/156 |
| 2010/0238121 A1* | 9/2010 | Ely | G06F 3/044 345/173 |
| 2011/0007037 A1 | 1/2011 | Ogawa | |
| 2011/0122087 A1* | 5/2011 | Jang | G06F 3/044 345/174 |
| 2011/0155479 A1* | 6/2011 | Oda | G06F 3/03545 178/18.06 |
| 2011/0169756 A1* | 7/2011 | Ogawa | G06F 3/03545 345/173 |
| 2012/0013555 A1* | 1/2012 | Maeda | G06F 3/03545 345/173 |
| 2012/0068964 A1* | 3/2012 | Wright | G06F 3/03545 345/174 |
| 2012/0105362 A1* | 5/2012 | Kremin | G06F 3/03545 345/174 |
| 2012/0154340 A1* | 6/2012 | Vuppu | G06F 3/044 345/179 |
| 2012/0242603 A1* | 9/2012 | Engelhardt | G06F 3/03545 345/173 |
| 2013/0106762 A1* | 5/2013 | Shahparnia | G06F 3/03545 345/174 |
| 2013/0176252 A1 | 7/2013 | Frojdh | |
| 2013/0181942 A1* | 7/2013 | Bulea | G06F 3/044 345/174 |
| 2013/0257793 A1* | 10/2013 | Zeliff | G06F 3/044 345/174 |
| 2013/0300708 A1* | 11/2013 | Kim | G06F 3/044 345/174 |
| 2014/0028576 A1* | 1/2014 | Shahparnia | G06F 3/0416 345/173 |
| 2014/0104224 A1* | 4/2014 | Ih | G06F 3/044 345/174 |
| 2014/0118308 A1* | 5/2014 | Rhee | G06F 3/0383 345/177 |
| 2014/0168140 A1* | 6/2014 | Sasselli | G06F 3/0416 345/174 |
| 2014/0176495 A1 | 6/2014 | Vlasov | |
| 2014/0253462 A1 | 9/2014 | Hicks | |
| 2014/0253468 A1 | 9/2014 | Havilio et al. | |
| 2014/0267147 A1* | 9/2014 | Buelow | G06F 3/044 345/174 |
| 2015/0070317 A1* | 3/2015 | Oda | G06F 3/044 345/174 |
| 2015/0193033 A1* | 7/2015 | Westhues | G06F 3/0416 345/173 |
| 2015/0199036 A1* | 7/2015 | Akitomo | G06F 3/038 345/173 |
| 2015/0317053 A1* | 11/2015 | Baek | G06F 3/0488 715/765 |
| 2015/0338950 A1* | 11/2015 | Ningrat | G06F 3/044 345/174 |
| 2015/0363012 A1* | 12/2015 | Sundara-Rajan | G06F 3/038 345/179 |
| 2015/0370352 A1* | 12/2015 | Michihata | G06F 3/03545 345/173 |
| 2016/0014598 A1* | 1/2016 | Westhues | H04W 12/04 380/259 |
| 2016/0018905 A1* | 1/2016 | Nagao | G06F 3/033 345/157 |
| 2016/0062511 A1* | 3/2016 | Park | G06F 3/044 345/174 |
| 2016/0117019 A1* | 4/2016 | Takeda | G06F 3/03 345/174 |
| 2016/0209940 A1* | 7/2016 | Geller | G06F 3/0416 |
| 2016/0224136 A1* | 8/2016 | Kremin | G06F 3/0383 |
| 2016/0246390 A1* | 8/2016 | Lukanc | G06F 3/0383 |
| 2016/0306445 A1* | 10/2016 | Fleck | G06F 3/0442 |
| 2016/0364091 A1* | 12/2016 | Bernstein | G06F 3/0482 |
| 2017/0060274 A1* | 3/2017 | Watanabe | G06F 3/0412 |
| 2017/0097695 A1* | 4/2017 | Ribeiro | G06F 3/03545 |
| 2017/0102798 A1* | 4/2017 | Qiao | G06F 3/044 |
| 2017/0123568 A1* | 5/2017 | Takeda | G06F 3/0416 |
| 2017/0131798 A1* | 5/2017 | Geaghan | G06F 3/044 |
| 2017/0153763 A1* | 6/2017 | Vavra | G06F 3/0488 |
| 2017/0177145 A1* | 6/2017 | Hara | G06F 3/044 |
| 2017/0228049 A1* | 8/2017 | Yamamoto | G06F 3/0383 |
| 2017/0285772 A1* | 10/2017 | Yamamoto | G06F 3/0416 |
| 2017/0322643 A1* | 11/2017 | Eguchi | G06F 3/044 |
| 2018/0011557 A1* | 1/2018 | Katsuhira | G06F 3/0383 |
| 2018/0046272 A1* | 2/2018 | Hara | G06F 3/044 |
| 2018/0129316 A1* | 5/2018 | Kremin | G06F 3/0414 |
| 2018/0164905 A1* | 6/2018 | Yamamoto | G06F 3/0416 |
| 2018/0181222 A1* | 6/2018 | Ivanov | G06F 3/03545 |
| 2018/0321785 A1* | 11/2018 | Hamaguchi | G06F 3/044 |
| 2018/0356908 A1* | 12/2018 | Koike | G06F 3/03 |
| 2019/0265809 A1* | 8/2019 | Shirai | G06F 3/0416 |
| 2019/0384423 A1* | 12/2019 | Hara | G06F 3/03545 |

FOREIGN PATENT DOCUMENTS

| | | |
|---|---|---|
| KR | 10-2010-0011808 A | 2/2010 |
| KR | 10-1398479 B1 | 5/2014 |
| KR | 10-2015-0054488 A | 5/2015 |
| WO | 2015/200396 A1 | 12/2015 |
| WO | 2016/004003 A1 | 1/2016 |

OTHER PUBLICATIONS

European Search Report dated May 11, 2020; European Application No. 17 786 073.1-1231.

* cited by examiner

GENERATE PEN WAKE UP SIGNAL

RECOGNIZE PEN TO BE BLACK

TRANSMIT IDENTIFICATION INFORMATION CORRESPONDING TO PEN BEING ID = 1

TOUCH SCREEN DEVICE, INPUT DEVICE, AND CONTROL METHOD THEREOF AND METHOD THEREOF

CROSS-REFERENCE TO RELATED APPLICATION(S)

This application claims the benefit under 35 U.S.C. § 119(a) of a Korean patent application filed on Apr. 22, 2016 in the Korean Intellectual Property Office and assigned Serial number 10-2016-0049491, the entire disclosure of which is hereby incorporated by reference.

TECHNICAL FIELD

The present disclosure relates to a touch screen device, an input device, and a control method thereof. More particularly, the present disclosure relates to a touch screen device, an input device, and a control method thereof for efficiently using a plurality of input devices.

BACKGROUND

The device equipped with a touch screen device such as tablet personal computer (PC), smartphone, and so on has recently been supplied, which allows a user to directly input information on a display screen with a stylus pen. Further, the user is able to write or erase information as he or she desires by contacting the touch screen with the stylus pen.

That is, the touch screen device is capable of determining a location of the stylus pen in contact with the screen, by a variety of ways, and tracking the trajectory of the stylus pen based on the determined location.

For example, the touch screen device can determine a location of the stylus pen based on the distribution of magnitude of certain frequency signals transmitted from the stylus pen to respective electrodes due to capacitive coupling between electrodes within the touch screen and the stylus pen.

Meanwhile, when determining a location of a plurality of stylus pens, the touch screen device may determine the location of each of the stylus pens based on different frequency signals transmitted from each of a plurality of stylus pens.

However, in order to determine the locations of a plurality of stylus pens in the manner described above, it is necessary to have frequency bands corresponding in number to the types of stylus pens. That is, frequency bands different from each other may be allotted corresponding to each of (n) number of stylus pens.

As such, because different frequencies may be set correspondingly for each of the stylus pens, there may be a limited number of stylus pens that can be used in limited frequency band.

Further, because different frequencies are set correspondingly for each of the stylus pens, the frequency bands set for stylus pens not in use may not be utilized, in which case the problem of inefficient use of frequency can occur in the limited frequency band.

Further, use of different types of stylus pens having different frequencies from each other has far complicated production and distribution process than a single type of stylus pens.

Further, when there is a plurality of same kind of stylus pens, and signals are coming from the plurality of stylus pens at the same frequency, the touch screen device would erroneously recognize the plurality of stylus pens to be one single stylus pen and perform abnormal operation accordingly.

Meanwhile, when the user draws an image including picture or text with a stylus pen by using various application programs on a device equipped with a touch screen, the user adjusts attributes such as color, thickness, and so on of the lines or the text being drawn, by using a tool provided by the respective application programs. It will be convenient for the user if the same color and type are maintained until the next change occurs, once the user selects setting associated with color and types of the line, because by this way, the user will be given continuous pen use environment. This function, if available, would allow a user to buy several same pens at the same time, and then designate one pen for red color, another pen for black color, and so on, for use. Alternatively, the user may define one pen to be a black pencil, another pen to be a blue fountain pen, yet another pen to be one of a variety of other types of pens, and so on, in which case the user will enjoy more intuitive use environment compared to when using only one pen by varying settings every time.

One may buy several types of pens with different frequencies from each other and use these to implement the function described above. However, because the method distinguishes types of pens based on operating frequencies of the pens, setting colors and types of different pens with the same frequency is complicated, and besides, there are also shortcomings of complex production and distribution as mentioned above. Accordingly, the user will be more efficient to buy the same type of pens and then select colors and types of the lines.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to address the shortcomings described above and also to respond to a demand for research and development for the technology mentioned above, and therefore, the present disclosure is directed to providing a touch screen device capable of touch inputting to a plurality of same type of input devices.

Another aspect of the present disclosure is to achieve efficient use of frequency bands to determine a location of an input device, from a touch screen device.

Another aspect of the present disclosure is to enable setting of attributes of an image being generated by an input device, from a touch screen device.

In accordance with an aspect of the present disclosure, a touch screen device is provided. The touch screen device includes a channel electrode configured to receive a signal from an input device, a driver circuit configured to apply a drive signal to the channel electrode, a receiver circuit configured to receive the signal from the channel electrode, and a processor configured to control the driver circuit to transmit an input device identification information to the input device such that, when a signal transmitted from the input device is received through the receiver circuit, based on a frequency of the received signal or a pattern of the received signal, the processor determines if the received signal is associated with the input device identification information transmitted to the input device.

The processor may control the driver circuit to transmit the input device identification information to the input device based on the input device being contacted with the touch screen device.

The touch screen device may additionally include a storage configured to store an initial state identification information, an allotted input device identification information, and an un-allotted input device identification information from among a plurality of input device identification information that includes at least one of frequency information and digital code information. When the received signal comprises the initial state identification information, the processor may transmit one of the un-allotted input device identification information to the input device.

When a signal is not received through the receiver circuit, within a preset threshold time, from the input device to which the input device identification information is transmitted, the processor may classify the input device identification information transmitted to the input device to be input device identification information not in use.

The driver circuit may transmit state information including the input device identification information and an attribute-associated information of an image being generated by the input device, to the input device.

In accordance with another aspect of the present disclosure, a control method of a touch screen device is provided. The control method includes transmitting an input device identification information to an input device through a channel electrode, receiving a signal from the input device through the channel electrode, and based on a frequency of the received signal or a pattern of the received signal, determining if the received signal is associated with the input device identification information transmitted to the input device.

The transmitting may include transmitting the input device identification information to the input device based the input device being contacted with the touch screen device.

The touch screen device may store an initial state identification information, an allotted input device identification information, and an un-allotted input device identification information from among a plurality of input device identification information that includes at least one of frequency information or digital code information. The touch screen device may determine if the received signal is associated with the input device identification information based on the stored information, and transmitting one of the un-allotted input device identification information to the input device when the received signal is an initial state identification information.

When a signal is not received, within a preset threshold time, from the input device to which the input device identification information is transmitted, the control method may additionally include classifying the input device identification information transmitted to the input device to be input device identification information not in use.

The control method may further include transmitting the input device identification information and an image attribute-associated information of an image being generated by the input device, to the input device.

In accordance with another aspect of the present disclosure, an input device is provided. The input device includes a driver circuit configured to generate a signal, a receiver circuit configured to receive from a touch screen device a signal including an input device identification information, and a processor configured to control the driver circuit to generate a signal associated with the input device identification information within a preset threshold time after receiving the signal including the input device identification information, and to generate a signal associated with state information including attributes of an image being generated by the input device after the preset threshold time, and then to transmit the generated signal associated with the state information to the touch screen device.

The input device identification information may be based on an order in which the input device is brought into contact with the touch screen device.

The input device may additionally include a storage configured to store the state information. When a signal including the state information is received from the touch screen device, the processor may update the state information previously stored in the storage with the state information included in the received signal.

The driver circuit may generate the state information and static state information that is not changed by the touch screen device.

When there is no contact with the touch screen device within the preset threshold time, the driver circuit may not generate a signal associated with the input device identification information.

In accordance with another aspect of the present disclosure, an input device is provided. The input device includes a driver circuit configured to generate an initial state identification signal, a receiver circuit configured to receive a signal including input device identification information from a touch screen device, and a processor configured to control the driver circuit to generate a random number in a non-reception state in which the signal including the input device identification information is not received, and generate the initial state identification signal based on the generated random number.

When a certain signal is received while the signal including the input device identification information is not received from the touch screen device, the processor may generate the random number.

The processor may control the driver circuit such that when the signal including the input device identification information is not received from the touch screen device, the driver circuit determines a drive section of the initial state identification signal based on the generated random number, or when the signal including the input device identification information is received from the touch screen device, the driver circuit generates a signal associated with the input device identification information.

The processor may control the driver circuit to generate the initial state identification signal based on a number of time of receiving the certain signal and on the random number.

In accordance with another aspect of the present disclosure, a control method of an input device is provided. The control method includes receiving a signal including input device identification information from a touch screen device, and generating a signal based on the received signal and transmitting the same to the touch screen device, in which the transmitting may include, after receiving the signal including the input device identification information, generating a signal associated with the input device identification information within a preset threshold time, and after the preset threshold time, generating a signal associated with state information including attributes of an image being generated by the input device to the touch screen device.

The input device identification information may be based on the input device being contacted with the touch screen device.

The control method may additionally include receiving the signal including the state information from the touch screen device, and updating the pre-stored state information based on the state information included in the received signal.

In accordance with another aspect of the present disclosure, a control method of an input device is provided. The control method includes generating a random number, generating an initial state identification signal based on the generated random number, transmitting the generated initial state identification signal to the touch screen device, and receiving a signal including the input device identification information from the touch screen device. When a certain signal is received while a signal including the input device identification information is not received, the generating the random number may include generating the random number.

When a signal including the input device identification information is not received from the touch screen device, the control method may additionally include determining a drive section for the initial state identification signal based on the generated random number. The generating the initial state identification signal may include generating the initial state identification signal in the determined drive section, and when a signal including the input device identification information is received from the touch screen device, the generating the initial state identification signal may include generating a signal associated with the input device identification information.

The generating the initial state identification signal may include generating the initial state identification signal based on the number of receiving the certain signal and on the random number.

According to a variety of embodiments, a touch screen device capable of touch inputting with respect to a plurality of same kind of input devices can be provided. Furthermore, use of the frequency to determine a location of the input device can be efficient at the touch screen device. Further, it is enabled to set attributes of an image being generated by the input device, from the touch screen device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
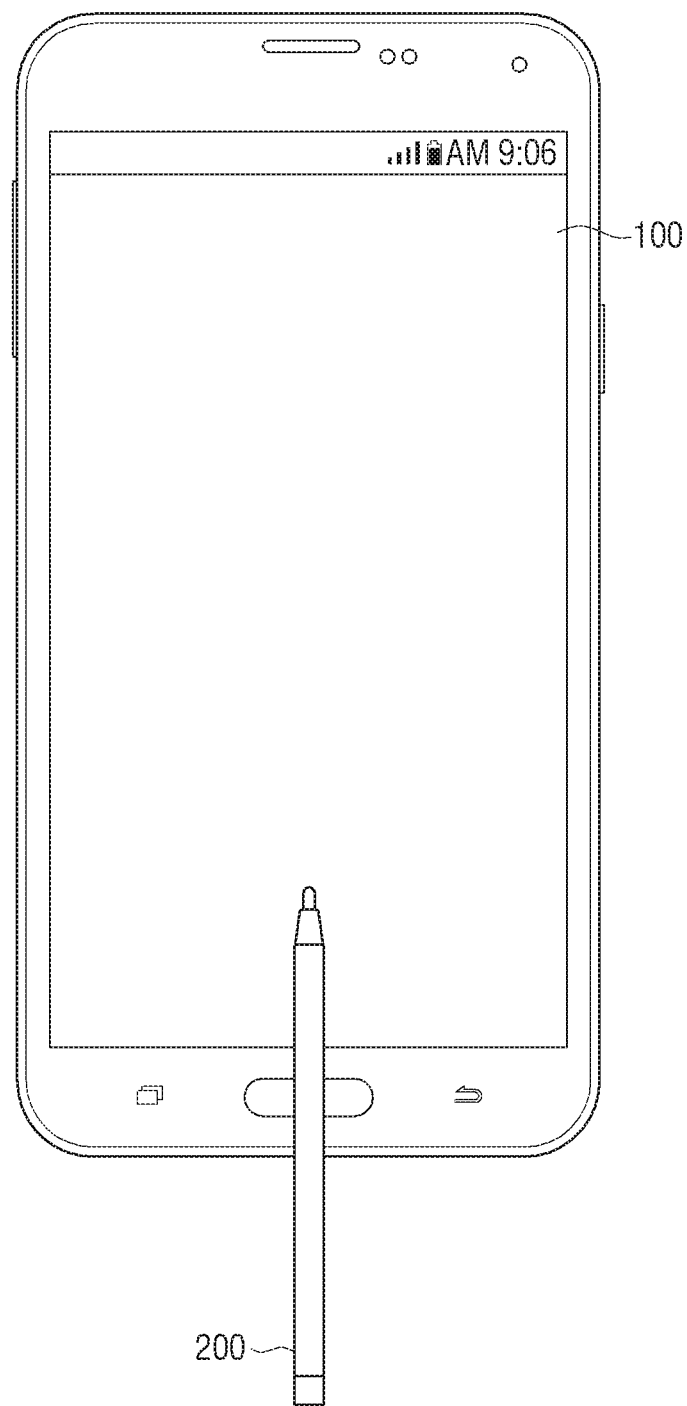
FIG. 1 is a conceptual view illustrating a constitution of a coordinate measuring system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, the same reference numerals or symbols used in the drawings accompanied with the disclosure refer to components or elements that perform substantially the same functions. For convenience of explanation and understanding, the same reference numerals or symbols are used in describing different embodiments. That is, the same reference numerals in a plurality of drawings do not necessarily mean that the drawings are directed to one same embodiment.

Further, terms including ordinal number such as "first," "second," and so on may be used in the description and the claims in order to distinguish among elements. The ordinal numbers are used in order to distinguish the same or similar elements from one another, and the use of the ordinal number should not be understood as limiting the meaning of the terms. For example, an element combined with an ordinal number is not limited because of the ordinal number in the order the element is being used, in the order the element is being disposed, and so on. Depending on needs, respective ordinal numbers may be exchangeably used.

It is to be understood that the term such as "comprise," or "consist of" is used herein to designate the presence of characteristic, number, operation, element, component, or a combination thereof, and not to preclude possibility of presence or addition of one or more other characteristics, numbers, operations, elements, components or a combination of these.

The term such as "module," "unit," "part", and so on is used to refer to an element that performs at least one function or operation, and such element may be implemented as hardware or software, or a combination of hardware and software. Further, a plurality of "modules," "units," "parts," and so on may be integrated into at least one module or chip and implemented as at least one processor (not illustrated), except when it is necessary that these have to be implemented as specific, separate hardware.

Further, when a certain portion is stated herein as being connected to another portion, this includes not only direct connecting, but also indirect connecting through another medium. Further, when a certain portion includes a certain element, unless specified to the contrary, this means that another element may be additionally included, rather than precluding another element.

A variety of embodiments will be described in detail below with reference to the accompanying drawings.

FIG. 1 is a conceptual view illustrating a constitution of a coordinate measuring system according to an embodiment of the present disclosure.

Referring to FIG. 1, a coordinate measuring system includes a touch screen device 100 and an input device 200.

The touch screen device 100 is capable of touch inputting, and may include a display device and a touch sense device. The touch screen device 100 may be included in a portable electronic device such as a laptop computer, a mobile phone, a smart phone, a portable multimedia player (PMP), a Moving Picture Experts Group phase 1 or phase 2 (MPEG-1 or MPEG-2) audio layer 3 (MP3) player or an electronic device such as an electronic blackboard.

When the input device 200 such as a stylus pen is brought into a contact with, or proximity to a display panel, such touch screen device 100 may determine a location of the input device 200 according to the various embodiments described below.

Specifically, the touch screen device 100 may include a plurality of electrodes, and sends out a drive signal to the electrodes such that the drive signals are transmitted by the capacitive coupling to the resonant circuit of the input device 200 being in proximity to the touch screen device 100. The touch screen device 100 may concurrently apply drive signals to the electrodes. In this case, the touch screen device 100 may apply the drive signals with the same phase to a plurality of electrodes, or apply drive signals with different phases to each of the electrodes by considering the location of the input device 200.

Further, the touch screen device 100 may receive signals generated at the input device 200 from each of a plurality of electrodes to thus determine the location of the input device 200. The detailed constitution and operation of the touch screen device 100 will be described in detail below.

The input device 200 may transmit the signals generated at the circuitry of the input device 200 to a plurality of electrodes within the touch screen device 100. The touch screen device 100 may determine the location of the input device 200 based on the distribution of the intensity of the signals received from the input device 200 through a plurality of electrodes. The input device itself may be equipped with a power supply for the purpose of generating signals.

Further, the touch screen device 100 may periodically generate a drive signal associated with wakeup, and send this out. In this case, among a plurality of input devices 200 located within a preset threshold range to the touch screen device 100, an input device 200 in inactive mode is changed into active mode according to the drive signal sent from the touch screen device 100.

Upon being changed into active mode, the input device 200 sends out a signal to the touch screen device 100. The signals sent to the touch screen device 100 may include a signal associated with initial state identification information, or a signal associated with input device identification information allotted by the touch screen device 100. Depending on the embodiment, the initial identification information may be a signal previously defined in association with the attributes of the image being generated by an input device set by a manufacturer or a user.

Hereinbelow, it is assumed that the input device 200 for which the input device identification information is allotted by the touch screen device 100 is a device registered to the touch screen device 100, and an input device 200 for which identification information is not allotted by the touch screen device 100 is a device unregistered to the touch screen device 100.

First, when the input device 200 is an unregistered device, the input device 200 may transmit the initial state identification information including information about the attributes of the image being generated at the input device. Accordingly, when it is determined by the analysis of the signal received from the input device 200 that the corresponding signal is a signal that contains initial state identification information, the touch screen device 100 determines that the input device 200 is an unregistered device.

Accordingly, among a plurality of input device identification information, the touch screen device 100 transmits un-allotted input device identification information to the input device 200. Meanwhile, when the input device identification information allotted by the touch screen device 100 is received, the input device 200 may transmit a signal to the touch screen device 100 based on the received input device identification information in the manner described below.

That is, upon receiving input device identification information allotted by the touch screen device 100, the input device 200 sends out a signal associated with the received input device identification information. When receiving a signal sent from the input device 200 through a plurality of electrodes, the touch screen device 100 determines based on the frequency of the received signal or the pattern of the received signal whether or not the received signal is associated with the input device identification information allotted to the input device 200.

When the result of determination indicates that the received signal is associated with the input device identification information allotted to the input device 200, the touch screen device 100 may determine a location of the input device 200 based on the intensity of the corresponding signal received through a plurality of electrodes, and perform an operation to control display based on the determined location information.

The coordinate measuring system according to an embodiment has been outlined so far. Hereinbelow, the respective components of the touch screen device 100 and the input device 200 of the coordinate measuring system according to various embodiments will be described in further detail.

Figure 2:
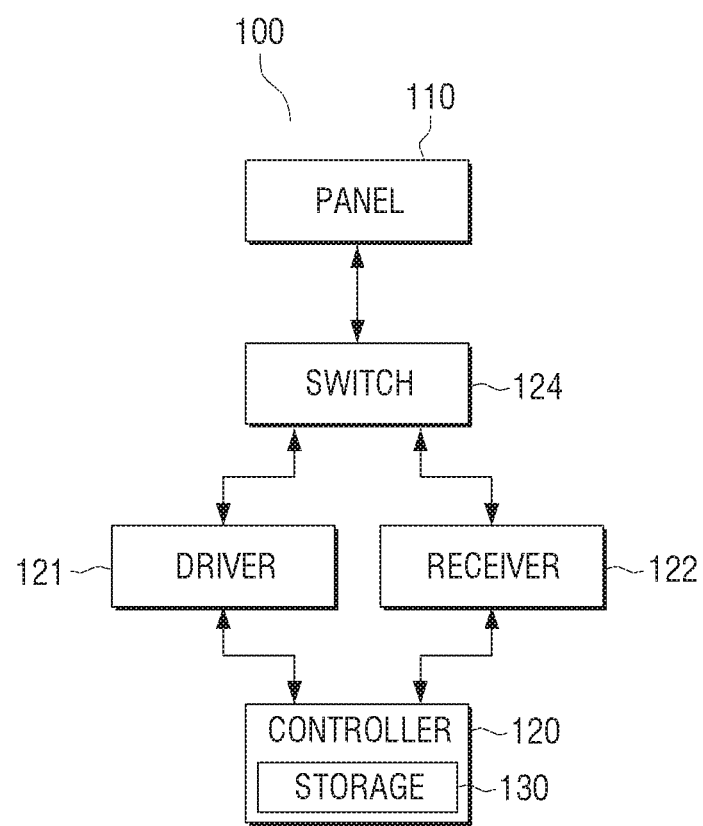
FIG. 2 is a block diagram of a touch screen device according to an embodiment of the present disclosure.

FIG. 2 is a block diagram of a touch screen device according to an embodiment of the present disclosure.

Referring to FIG. 2, a touch screen device 100 includes a panel 110, a switch 124, a driver 121, a receiver 122, and a controller 120. Further, the controller 120 may include a storage 130 to store information. However, the present disclosure is not limited thereto. Accordingly, the storage 130 may be implemented as an independent hardware component that may be provided within the touch screen device 100.

The panel 110 may display image information, or receive a touch command by a contact by the input device 200 such as a stylus pen or a body part of the user.

As such, the panel 110 may include a plurality of electrodes to receive a touch command from at least one of the user's body contact or the input device 200, and may determine a location at which the user or the input device 200 is approaching or contacting, based on a response signal received from at least one of a plurality of electrodes.

Meanwhile, a plurality of electrodes within the panel 110 may take an orthogonal grid form in order to determine received signal by capacitive coupling, or take an orthogonal loop form in order to determine a location based on the received signal by inductive coupling.

The controller 120 controls the operations of the respective components of the touch screen device 100. Specifically, as described above, the controller 120 determines a location of the input device 200 which is either approaching or contacting the panel 110, based on at least one of a plurality of electrodes included in the panel 110 which may be implemented in a touch screen form.

Specifically, among a plurality of electrodes included in the panel 110, at least one electrode located near a location where the input device 200 is approaching or contacting receives a signal transmitted from the input device 200 which is in proximity to, or contact with the panel 110. Accordingly, the controller 120 may determine a location of the input device 200 based on the signal received through at least one electrode of the plurality of electrodes, or determine whether the input device 200 is registered or not.

According to an embodiment, when a signal sent out from the input device 200 in proximity to, or contact with the panel 110 is received through at least one electrode of a plurality of electrodes included in the panel 110, the controller 120 analyzes the frequency of the received signal or pattern of the signal to determine whether the input device 200 is registered or not.

More specifically, the controller 120 may determine whether the corresponding input device 200 is registered or not based on the frequency of the received signal or the pattern of the received signal, by determining whether the received signal is associated with the initial state identification information as set by the manufacturer or the user, or associated with the input device identification information allotted to the input device 200.

The initial state identification information refers to information that indicates that the input device 200 is before being registered to the touch screen device 100, and it may include information to control the attributes of the image generated by the input device 200. An example of the information to control image attributes may include, for example, color, thickness, and so on of a line drawn by a stylus pen. The frequency or signal pattern that indicates the initial state identification information may be defined during manufacture of the touch screen device 100 and the input device 200.

Accordingly, the controller 120 may determine whether the signal received from the input device 200 is initial state identification information or input device identification information by referring to the storage 130 that stores information to determine initial state identification information and input device identification information among a plurality of identification information that includes at least one of frequency information and digital code information.

Further, the input device identification information is the information that can determine the input device 200 of a plurality of input devices 200 registered to the touch screen device 100 that corresponds to the received signal. When it is determined that the received signal includes the initial state identification information, the controller 120 determines that the input device 200 in proximity to, or contact with the panel 110 is an unregistered device and transmits one of the un-allotted input device identification information to the input device 200.

According to an embodiment, the controller 120 may transmit one of the un-allotted input device identification information to the input device 200 based on an order of contacting the touch screen device 100.

For example, suppose that there are un-allotted input device identification information Nos. 1 and 2 and that input device A contacts or approaches the panel 110 of the touch screen device 100, then input device identification information No. 1 may be allotted to the input device A. Then when the unregistered input device B contacts or approaches the panel 110 of the touch screen device 100, input device identification information No. 2 may be allotted to the input device B.

As described above, when the input device identification information is allotted to the unregistered input device 200, the controller 120 stores to the storage 130 that the corresponding input device identification information has been allotted.

Meanwhile, when the received signal is associated with the input device identification information that has already been allotted by the touch screen device 100, the controller 120 may determine that the corresponding input device 200 is a previously registered device and may determine a contact or proximity location of the input device 200 that has the corresponding input device identification information based on the signal received from a plurality of electrodes.

Meanwhile, the panel 110 may display an image attribute adjustment image for controlling attributes of an image being generated by the touch screen device 100. Meanwhile, when the input device 200 determined to be the registered device of the touch screen device 100 is located over the image attribute adjustment image as displayed, and when it is determined that one of a plurality of image attributes included in the image attribute adjustment image is selected, the controller 120 updates an image attribute matching the input device identification information allotted to the input device 200 to be a selected image attribute. Additionally, the controller 120 transmits information about the updated image attribute to the input device 200 through the driver 121 and a channel electrode. Accordingly, the input device 200 may update the preset image attribute based on the information received from the touch screen device 100.

For example, the input device 200 may store state information about preset color A. With this state information being stored, the input device 200 may receive updated information about the image attribute from the touch screen device 100. In such case, the input device 200 may perform update operation from the state information about the preset color A to the state information about color B, based on the received information.

Meanwhile, after transmitting input device identification information allotted to the input device 200, the controller 120 may classify whether the input device identification information has been allotted or not, based on the various embodiments described below.

In one embodiment, when a signal is not received for a preset threshold time from the input device 200 after sending out the signal including input device identification information, the controller 120 classifies the input device identification information transmitted to the input device 200 to be the input device identification information not in use. That is, when a signal is not received for a preset threshold time from the input device 200 after allotting input device identification information, the input device identification information allotted to the input device 200 may be classified to be the un-allotted input device identification information.

According to an embodiment, when an intensity of the signal received from the input device 200 after allotting input device identification information is below an intensity threshold for a preset threshold time, the controller 120 classifies the input device identification information allotted to the input device 200 to be the non-use identification information. Accordingly, the input device identification information allotted to the input device 200 may be classified to be the un-allotted identification information.

Meanwhile, the controller 120 described above may be implemented to be various forms of processors including single core, multi core, triple core, and quad core, and specifically, may be combined with the components described above into a system-on-a-chip (or system on chip, SOC, SoC, etc.).

Hereinbelow, circuit constitution of the panel 110 and respective operations of the controller 120 described above will be explained in further detail.

Figure 3:
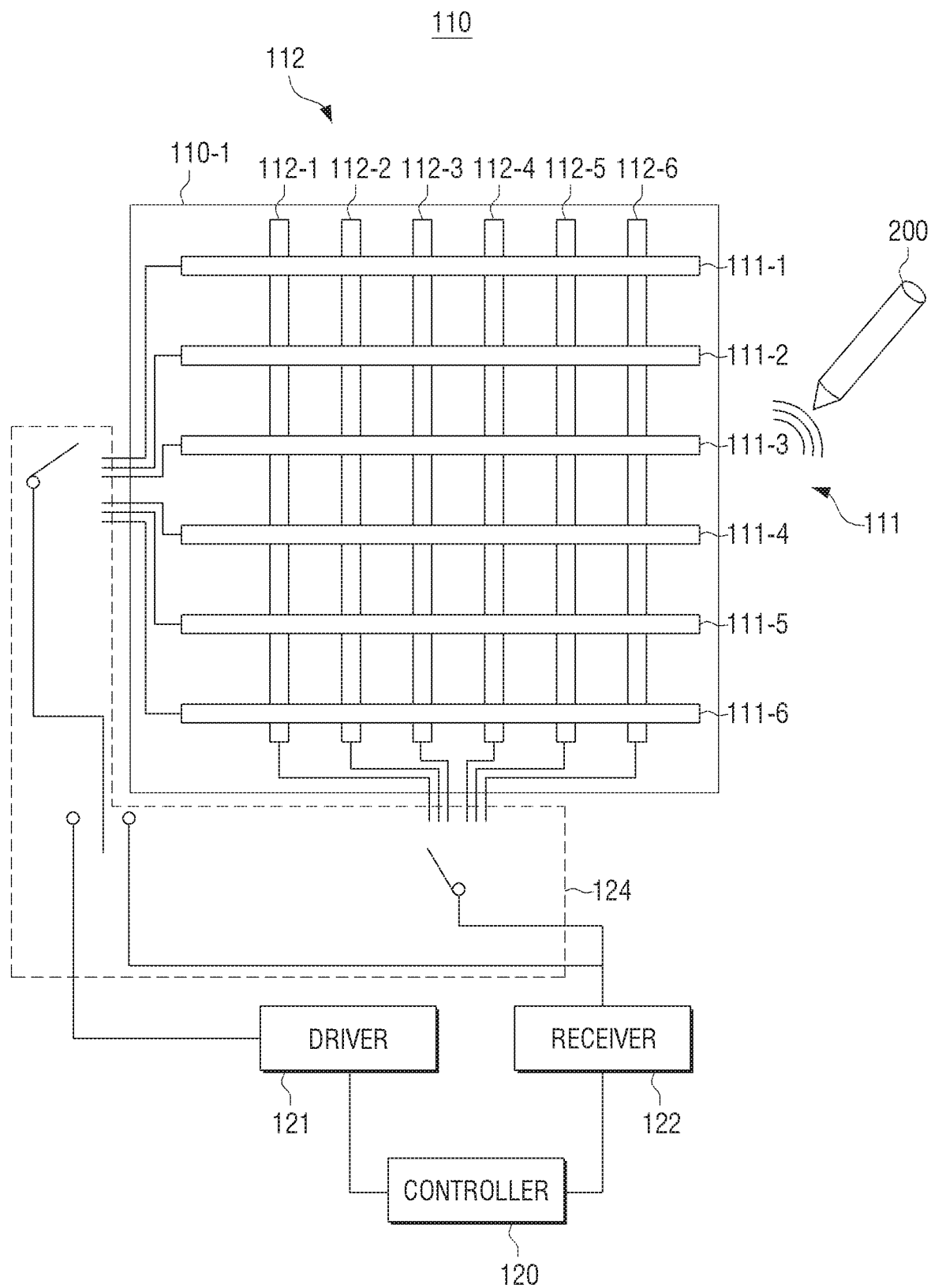
FIG. 3 is a circuit diagram of a panel according to an embodiment of the present disclosure.

FIG. 3 is a circuit diagram of a panel according to an embodiment of the present disclosure.

Referring to FIG. 3, a panel 110 includes a channel electrode 110-1 to receive signals from the input device 200. Such channel electrode 110-1 may include a first electrode group 111 and a second electrode group 112 disposed in different directions from each other.

The first electrode group 111 may be implemented to be a plurality of first electrodes 111-1, 111-2, 111-3, 111-4, 111-5, 111-6 disposed in a first direction (e.g., horizontal direction). The first electrode is a transparent electrode which may be indium tin oxide, for example. Such first electrodes 111-1, 111-2, 111-3, 111-4, 111-5, 111-6 in the first electrode group 111 are connected to the driver 121 or the receiver 122 through the switch 124.

The second electrode group 112 may be implemented to be a plurality of second electrodes 111-1, 111-2, 111-3, 111-4, 111-5, 111-6 disposed in a second direction (e.g., vertical direction). The second electrode is a transparent electrode which may be indium tin oxide (ITO) for example. Such a plurality of second electrodes 111-1, 111-2, 111-3, 111-4, 111-5, 111-6 in the second electrode group 111 are connected to the driver 121 or the receiver 122 through the switch 124.

Meanwhile, although the drawings exemplify that each electrode group includes six electrodes only, more or less electrodes may be used in actual implementation. Further, although the drawings exemplify the electrodes in the electrode group in simple rectangular shapes, the electrodes may take more complex shapes in actual implementation.

Meanwhile, the controller 120 described above may transmit and receive signals with the input device 200, using the first and second electrode groups 111, 112 included in the channel electrode 110-1. For convenience of explanation, the section for outputting transmission-related signals will be referred to as the transmission section, and the section for receiving the signals outputted from the input device 200 will be referred to as the reception section.

The driver 121 applies drive signal to the channel electrode 110-1 during transmission section. According to an embodiment, the driver 121 may be implemented to be a drive circuit to apply drive signals to the channel electrode 110-1. The driver 121 applying drive signals to the channel electrode 110-1 will not be described in detail herein, as this is well known technique in the technical field of electronic device such as touch screen device 100.

The drive signal applied to the channel electrode 110-1 through the driver 121 that may be implemented as a drive circuit, may be a signal having a certain frequency associated with wakeup that activates the input device 200 from inactive state, or a signal with a certain pattern.

Specifically, during transmission section, the driver 121 may concurrently apply drive signal to the plurality of first electrodes 111-1, 111-2, 111-3, 111-4, 111-5, 111-6 included in the first electrode group 111 or may apply drive signal sequentially. Alternatively, the driver 121 may apply drive signal to a unit of predetermined number (e.g., two to five) of electrodes sequentially. In such case, the unit of predetermined number of electrodes may be successively disposed electrodes or electrodes dispersed according to a certain pattern.

As described above, with the drive signal being applied to at least one of a plurality of first electrodes, the drive signal may be transmitted to the input device 200 by capacitive coupling between the electrode to which the drive signal is applied and the input device 200.

Accordingly, the input device 200 is changed into active mode according to the wakeup-associated drive signal received from the touch screen device 100. Meanwhile, as described above, an input device 200 which is un-allotted with the identification information by the touch screen device 100 may be an unregistered device to the touch screen device 100. In such case, the input device 200 may generate initial state identification information and output the same. The initial state identification information may include initially-set image attribute-related state information.

Moreover, the driver 121 may transmit the input device identification information allotted to the unregistered input device 200 of the touch screen device 100 to the corresponding input device 200, under control of the controller 120.

The receiver 122 receives the signal outputted from the input device 200 through the channel electrode 110. Specifically, during the reception section, the receiver 122 may receive a signal outputted from the input device 200 through a plurality of electrodes included in the channel electrode 110-1. The method of receiving signals outputted from the input device 200 may be achieved based on a variety of embodiments.

According to an embodiment, the receiver 122 may receive a signal outputted from the input device 200 using both the first and second electrode groups 111, 112.

According to an embodiment, the receiver 122 may sequentially receive the signals outputted from the input device 200 based on each electrode unit, or may receive signals outputted from the input device 200 using a preset plurality of electrodes. In such case, the electrodes used for the reception may be successively-aligned electrodes, or electrodes aligned at intervals.

For example, the controller 120 may control the driver 121 such that the drive signal is applied to at least one of a plurality of first electrodes included in the first electrode group 111 during the first time section (i.e., during transmission section). Further, after the application of the drive signal and during the second time section (i.e., during reception section), the controller 120 may control the receiver 122 to receive a signal outputted from the input device 200 from at least one of a plurality of second electrodes included in the second electrode group 112.

Specifically, the controller 120 controls the driver 121 to transmit a signal including input device identification information allotted to the input device 200, to the input device 200.

Moreover, when receiving a signal transmitted from the input device 200 through the receiver 122, the controller 120 may determine, based on the frequency of the received signal or the pattern of the received signal, whether the signal is associated with the input device identification information transmitted to the input device 200, and determine whether or not the corresponding input device 200 is registered to the touch screen device 100 or not.

When the result of determination indicates that the received signal is initial state identification information, the input device 200 is determined to be an unregistered device. The unregistered device may be an input device 200 to which identification information has not been allotted.

When the input device 200 is determined to be the unregistered device as described above, the controller 120 selects one of the plurality of un-allotted identification information previously stored at the storage 130, and controls the driver 121 to transmit a signal for the selected identification information to the input device 200. The identification information previously stored at the storage 130 may include at least one of frequency information and digital code information.

According to an embodiment, the controller 120 may allot un-allotted input device identification information to the input devices 200 based on the order of the input devices 200 being in contact with or proximity to the panel 110 of the touch screen device 100.

For example, the touch screen device 100 may have 10 input device identification information ID1 to ID10 including frequency information, and three ID1 to ID3 out of ten identification information may have already been allotted and used. In such case, the controller 120 may determine one ID4 of the seven un-allotted identification information to be the input device identification information for the input device 200 transmitting the initial state identification information, and controls the driver 121 to transmit the determined input device identification information ID4 to the input device 200.

Accordingly, the driver 121 may apply a signal with the frequency or pattern that corresponds to the input device identification information ID4 to the channel electrode 110-1 in the transmission section timing. Accordingly, an input device 200 capacitive coupled with at least one of a plurality of first electrodes included in the first electrode group 111 may receive a signal applied to the channel electrode 110-1, and receive input device identification information ID4 based on the frequency or pattern of the received signal.

Meanwhile, the input device identification information may be delivered in a form of frequency of pattern of a signal, according to an embodiment. Specifically, the controller 120 may generate a signal pattern that includes a digital code to represent the input device identification information and transmit the same to the input device 200. In this case, the input device 200 may analyze the pattern of the signal received from the touch screen device 100, acquire digital code information, and acquire input device identification information from the acquired digital code information.

Meanwhile, when the input device 200 is determined to be a previously registered device, the controller 120 may determine a location of the input device 200 based on the signal received through the receiver 122.

Specifically, when determining that the received signal includes input device identification information allotted to the input device 200 based on the frequency or pattern of the signal received through the receiver 122, the controller 120 may determine that the input device 200 is a device previously registered to the touch screen device 100.

As described above, when it is determined that the signal including allotted input device identification information is being received, the controller 120 may determine the location of the input device 200 according to various embodiments described below.

Specifically, when a signal is received from a plurality of electrodes included in the channel electrode 110-1 through the receiver 122, the controller 120 may determine the location of the input device 200 based on the signal intensity among the signals received from a plurality of first electrodes included in the first electrode group 111 and the signal intensity among the signals received from a plurality of second electrodes included in the second electrode group 112.

For example, when the signal intensity of the electrode 111-3 included in the first electrode group 111 is greater than the signal of the other electrodes in the first electrode group 111, and when the signal intensity of the electrode 112-2 included in the second electrode group 112 is greater than signal intensity of the other electrodes in the second electrode group 112, an intersection between the electrode 111-3 and the electrode 112-2 may be determined to be the location of the input device 200.

However, when the location of the input device 200 is determined in the manner described above, the resolution at the corresponding location and the distance between electrodes become identical. Accordingly, in order to determine the location with higher resolution, the location of the input device 200 is determined by the interpolation by comparing the intensities of the signals received from the electrodes included in each electrode group.

The switch 124 may selectively connect a plurality of electrodes to the driver 121, or selectively connect a plurality of electrodes to the receiver 122. Specifically, the switch 124 may connect an electrode to apply drive signal and the driver 121 according to a control command from the controller 120. However, the present disclosure is not limited to any specific embodiment. Accordingly, the switch 124 may be directly connected to the controller 120, and perform switching operation according to the control command of the controller 120 to thus connect the electrode to apply drive signal and the driver 121.

At this time, the switch 124 may keep an electrode grounded or floated when drive signal is not applied to such electrode.

Figure 4:
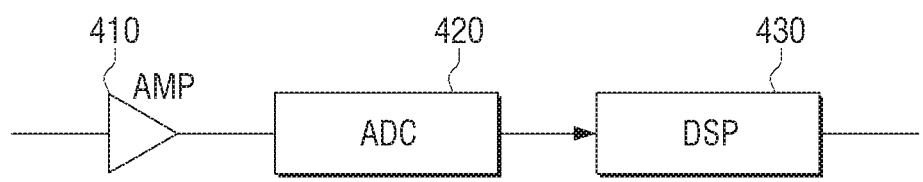
FIG. 4 is a block diagram illustrating a constitution of a receiver according to an embodiment of the present disclosure.

Meanwhile, the receiver 122 described above may have the configuration as illustrated in FIG. 4 to output the information included in the signal outputted from the input device 200 to the controller 120.

FIG. 4 is a block diagram of a receiver according to an embodiment of the present disclosure.

Referring to FIG. 4, the receiver 122 includes an amplifier (AMP) 410, an analog to digital converter (ADC) unit 420, and a digital signal processor (DSP) 430.

The AMP 410 amplifies a signal delivered from respective electrodes and outputs the result.

The ADC unit 420 converts signal amplified through the AMP 410 into digital signal, and the signal processor 430 may extract frequency or pattern of the signal with signal processing the signal digitized through the ADC unit 420. The method such as Fourier transformation may be used as a method of extracting frequency from the received signal. In order to extract the pattern of the received signal, certain frequency component may be extracted with a method such as Fourier transformation and then the signal intensity of the frequency component may be extracted. Such signal processing is performed at the signal processor 430.

As described above, the signal received from the electrodes is not only the desired signal, but also the noise. In order to eliminate such noise, as described above, it is very effective to extract only the frequency component corresponding to the frequency domain of the signal with the Fourier transformation, and so on, and by doing so, the receptivity to the received signal can be enhanced.

Meanwhile, although an example is described above, in which the receiver 140 amplifies the signal from a plurality of electrodes using a single AMP 410 only, the embodiments are not limited thereto. Accordingly, it is also possible to reduce amplification time of the signal by amplifying the signals received through a plurality of electrodes using a plurality of AMPs 410.

Meanwhile, the operation of the controller 120 described above may be accomplished by the programs stored at the storage 130. The storage 130 may be implemented to be at least one of read only memory (ROM), random access memory (RAM), flash memory, and various forms of memory devices.

The respective configurations of the touch screen device 100 according to an embodiment has been described above. Hereinbelow, an operation of the touch screen device 100 for allotting input device identification information to the unregistered input device 200 according to an embodiment will be described.

FIGS. 5A to 5D exemplify an operation at a touch screen device which allots input device identification information to the unregistered input device according to various embodiments of the present disclosure.

Figure 5A:
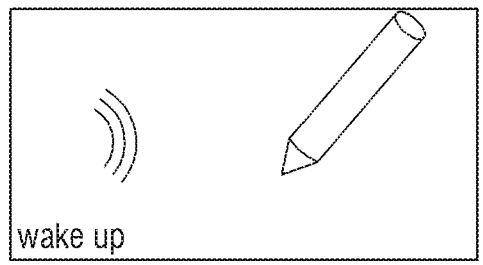
FIGS. 5A to 5D exemplify an operation of a touch screen device for allotting input device identification information to an unregistered input device according to various embodiments of the present disclosure.

Referring to FIG. 5A, a touch screen device 100 periodically sends out a wakeup-associated drive signal through the channel electrode 110-1 included in the panel 110. Meanwhile, when the input device 200 is located within a preset threshold distance from the panel 110 of the touch screen device 100, the input device 200 may receive a drive signal applied to at least one electrode by the capacitive coupling with at least one of a plurality of electrodes included in the channel electrode 110-1.

Accordingly, the input device 200 is changed into active mode based on the received drive signal, and after the change into active mode, the input device 200 sends out a signal with a certain frequency or pattern that includes the initial state identification information.

In one embodiment, the signal with 300 kHz frequency may be defined to be the initial state identification information that indicates that the input device 200 is an unregistered one. In such example, the input device 200 may send out 300 kHz signal, referring to FIG. 5B. When receiving 300 kHz signal from the input device 200, the touch screen device 100 may determine that the corresponding input device 200 needs to be registered.

Accordingly, when determining that the signal received from the input device 200 includes initial state identification information, the touch screen device 100 determines that the input device 200 is the device not registered to the touch screen device 100. Such unregistered device may be a device that is not allotted with the input device identification information.

Figure 5C:
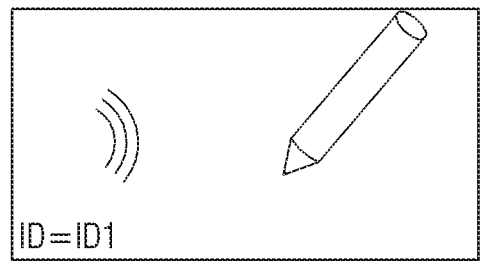
Figure 5B:
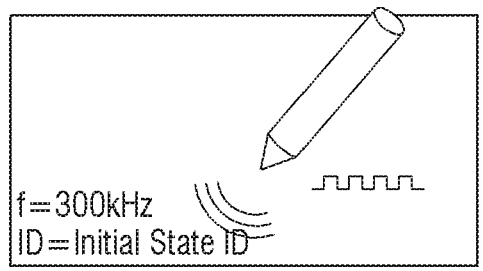

When determining that the input device 200 is an unregistered device, referring to FIG. 5C, the touch screen device 100 selects one of a plurality of un-allotted input device identification information, and sends the signal containing the selected input device identification information to the input device 200.

Figure 5D:
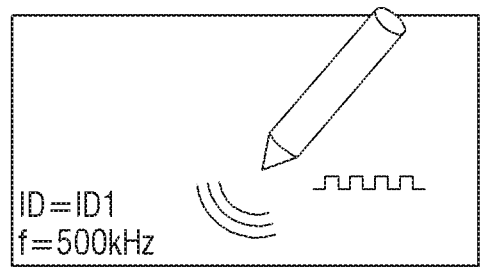

Meanwhile, on receiving a signal about the identification information allotted from the touch screen device 100, referring to FIG. 5D, the input device 200 sends out a signal containing the identification information allotted to the input device 200 based on the signal received from the touch screen device 100. That is, the input device 200 may transmit a 500 kHz signal containing identification information with identification No. ID1 to the touch screen device 100.

When the signal as described above is received from the input device 200, the touch screen device 100 analyzes the frequency of the received signal or the pattern of the received signal. When determining based on the result of analysis that the received signal is associated with the input device identification information allotted to the input device 200, the touch screen device 100 calculates a location of the input device 200 in proximity to, or contact with the panel 110. The touch screen device 100 may then generate an image associated with the input device identification information corresponding to the calculated location of the input device 200 and display the same.

Hereinbelow, an operation at the touch screen device 100 for determining whether or not to maintain the allotment of the identification information based on the operational state of a plurality of input devices allotted with the identification information, will be described in detail.

FIGS. 6A to 6E exemplify a process at a touch screen device for determining allotment of identification information according to operational states of a plurality of input devices according to various embodiments of the present disclosure.

Figure 6A:
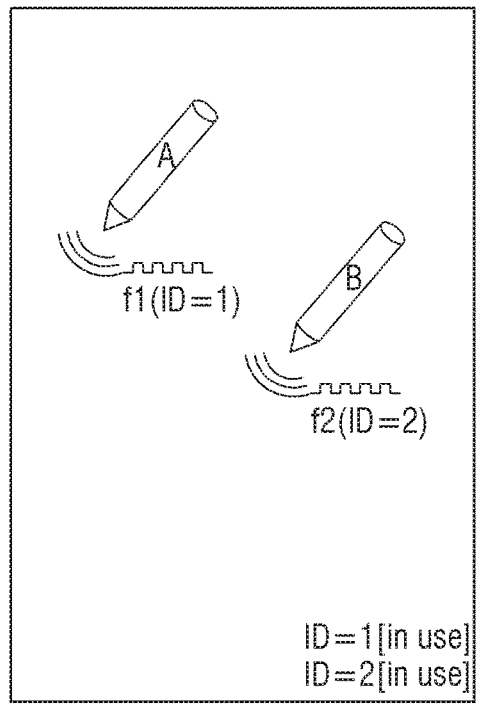
FIGS. 6A to 6E exemplify a process at a touch screen device for determining identification information allotment according to operational states of a plurality of input devices according to various embodiments of the present disclosure.

Referring to FIG. 6A, a touch screen device 100 is receiving a signal associated with input device identification information (ID=1) from an input device A, and is receiving a signal associated with input device identification information (ID=2) from an input device B. According to an embodiment, the input device identification information may be delivered to the touch screen device 100 with a method of defining the frequencies so that the signals generated from each of the respective input devices 200 are different. That is, by way of defining the frequency of the signal corresponding to input device identification information (ID=1) to be f1=500 kHz, and defining the frequency of the signal corresponding to the input device identification information (ID=2) to be f2=600 kHz, and so on, the touch screen device 100 may determine, based on the frequency of the received signal, the input device 200 that has generated the signal with the input device identification information that corresponds to the signal.

The touch screen device 100 may store in the storage 130 that the input device identification information (ID=1, 2) respectively allotted to the input devices A and B are in use.

Figure 6B:
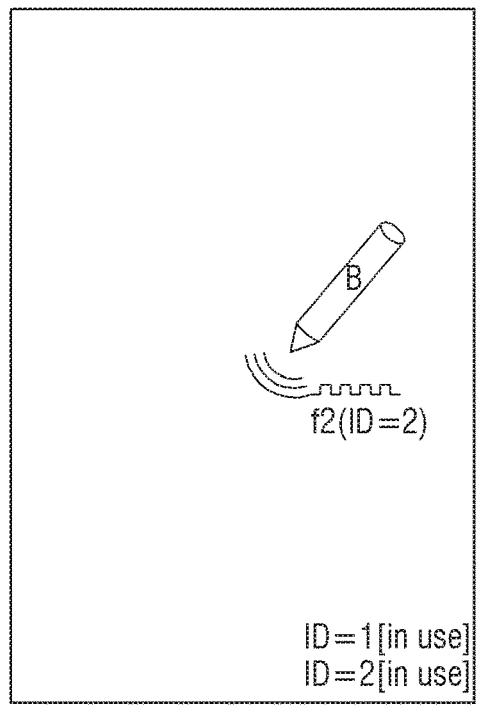

Meanwhile, referring to FIG. 6B, when the input device A is a predetermined time away from the touch screen device 100 but within a threshold time period, the input device A generates a signal corresponding to ID=1 and the touch screen device 100 may determine that the input devices A and B are still using the input device identification information (ID=1, ID=2).

Figure 6C:
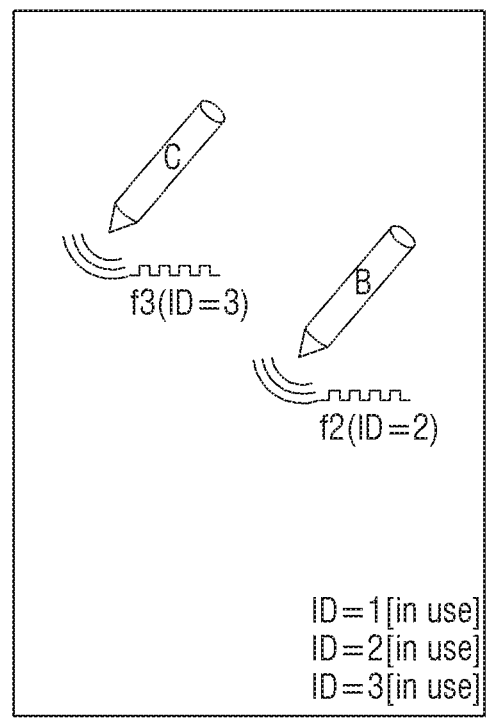
Figure 6C:
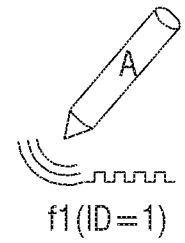

Accordingly, with the input devices A and B each storing the input device identification information (ID=1, 2) allotted thereto, in response to approach or contact of an unregistered input device C to the touch screen device 100, referring to FIG. 6C, the touch screen device 100 may select ID=3 among the un-allotted input device identification information based on the previously stored un-allotted identification information, allots the selected input device identification information to the input device C, and transmits a signal for the allotted identification information to the input device C. Accordingly, based on a signal received from the touch screen device 100, the input device C outputs a signal associated with the input device identification information ID=3.

Meanwhile, the touch screen device 100 stores in the storage 130 that the input device identification information ID=3 allotted to the input device C is in use.

Figure 6D:
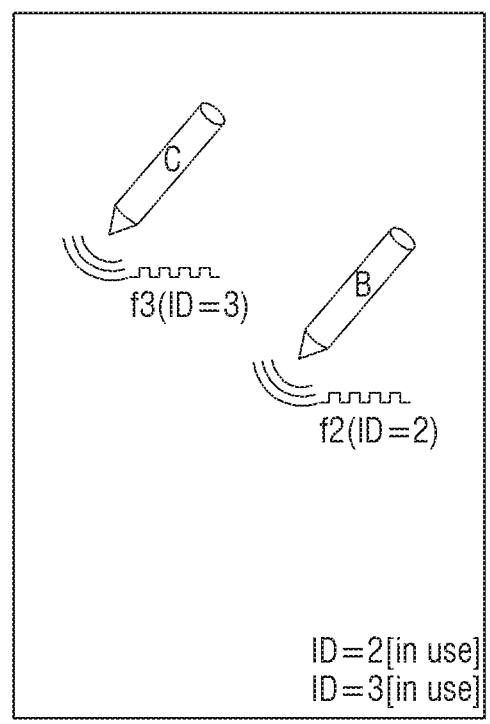
Figure 6D:
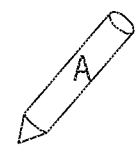

Meanwhile, referring to FIG. 6D, the input device A may be outside a preset threshold range away from the touch screen device 100. In such case, the intensity of a signal containing input device identification information (ID=1) received at the touch screen device 100 may be below the preset threshold intensity or may not be received at all.

Accordingly, when the intensity of a signal containing input device identification information (ID=1) is below the threshold intensity for a preset threshold time, or when a signal containing input device identification information (ID=1) is not received, the touch screen device 100 determines that the input device identification information (ID=1) allotted to the input device A is not in use.

When determining that the input device identification information (ID=1) allotted to the input device A is not in use, the touch screen device 100 classifies the input device identification information (ID=1) allotted to the input device A to be the un-allotted input device identification information. Accordingly, among the input device identification information (ID=1, 2, 3) in use, the touch screen device 100 may update the input device identification information (ID=2, 3) to be the allotted input device identification information, except the input device identification information (ID=1) that is classified as the un-allotted identification information.

At this time, the input device A ceases to generate a signal associated with the input device identification information (ID=1).

Specifically, the input device A may periodically receive drive signals from the touch screen device 100, and when the intensity of the received drive signal is below the threshold intensity for a preset threshold time or when the drive signal is not received from the touch screen device 100 for a preset threshold time, the input device identification information allotted from the touch screen device 100 is reset. The input device A then changes into inactive mode for the power saving purpose. Accordingly, the input device A may cease to generate a signal associated with the input device identification information (ID=1).

Figure 6E:
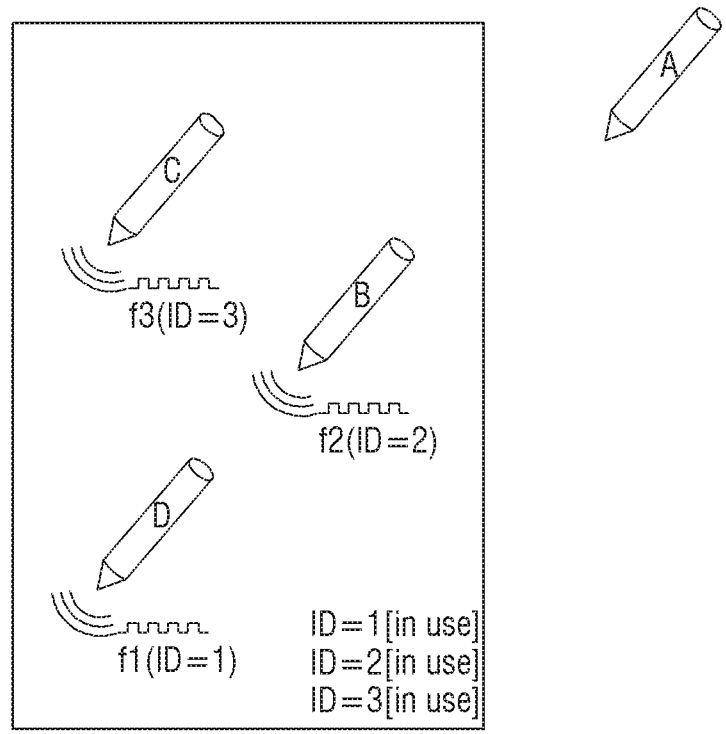

As described above, while storing the input device identification information (ID=2, ID=3) respectively allotted to the input devices B and C as the input device identification information in use, referring to FIG. 6E, when an unregistered input device D is approaching or contacting the touch screen device 100, the touch screen device 100 allots un-allotted input device identification information (ID=1) to the input device D, and transmits a signal containing the allotted input device identification information (ID=1) to the input device D. Accordingly, the input device D may output a signal associated with the input device identification information (ID=1) based on the signal received from the touch screen device 100.

Meanwhile, in relation with the input device identification information in use, the touch screen device 100 performs update to add the input device identification information (ID=1) allotted to the input device D to the input device identification information (ID=2, 3) that are already in use.

As described above, the touch screen device 100 according to an embodiment maintains allotting the input device identification information allotted to the corresponding input device 200 or change into un-allotted input device identification information, according to the operational state of the input device 200 to which the input device identification information is allotted such that the frequencies of a plurality of input devices 200 in the proposed frequency band can be used more efficiently.

Meanwhile, according to an embodiment, when a wakeup signal is received at the input device 200 from the touch screen device 100, a signal containing initial state identification information may be generated as described above. However, the present disclosure is not limited to any specific example. Accordingly, the input device 200 may generate a signal containing initial state identification information in response to a pen tip or button included in the input device 200 being pressed.

FIGS. 7A to 7F exemplify transmission of initial identification information containing information about image attributes, and change of information about image attributes, performed at an input device according to various embodiments of the present disclosure.

Referring to FIGS. 7A to 7F, a user is capable of maintaining or changing the attributes of the image being generated by the input device 200 even when the input device 200 is not in use.

Specifically, referring to FIGS. 7A to 7F, the touch screen device 100 periodically generates a wakeup signal to find a new input device 200. The non-use input device 200, which has not generated a signal for the power saving purpose, starts generating signals upon receiving a wakeup signal from the touch screen device 100. Such input device 200 may be an active type input device.

The input device 200 generates initial state identification signal containing initial state identification information, but depending on the state information previously stored at the input device 200, the input device 200 generates different types of initial state identification signals. The 'state information' may be the information that represents the attributes of an image being generated by the input device 200. That is, the state information may be the information that represents colors, types, and so on of an image being generated by the input device 200. For example, when color A (black) =300 kHz, color B (red)=310 kHz, and color C (green)=320 kHz, the input device 200 generates an initial state identification signal of frequency that corresponds to the color of the image corresponding to the previously stored state information.

At this time, the touch screen device 100 recognizes from the frequency of the received signal that a new input device 200 has entered, with the state information of the newly-entering input device 200. That is, referring to FIG. 7B, the touch screen device 100 recognizes that a new input device 200 with state information=color A (black) has entered.

Figure 7A:
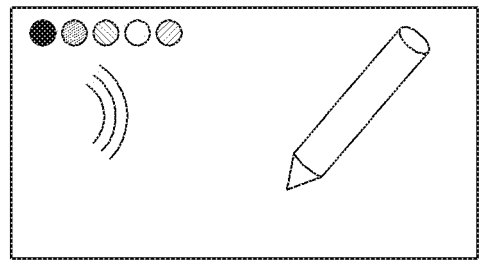
FIGS. 7A to 7F exemplify an operation of an input device of transmitting initial identification information including information about attributes of an image and changing information about attributes of the image according to various embodiments of the present disclosure.
Figure 7B:
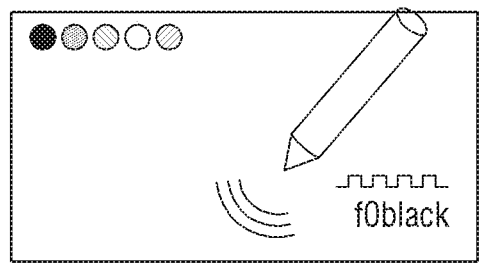
Figure 7C:
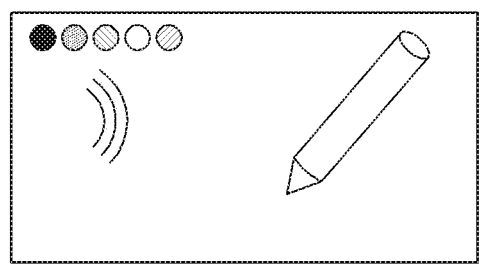

Upon sensing the new input device 200, referring to FIG. 7C, the touch screen device 100 transmits information corresponding to the identification information (ID=1) of the un-allotted input device to the input device 200.

Figure 7D:
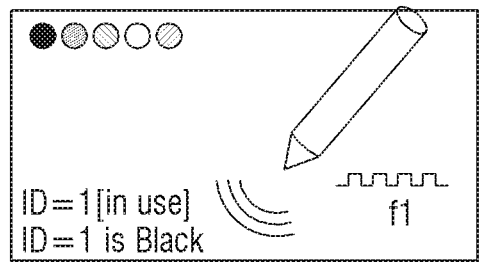

After that, upon receiving the input device identification information corresponding to ID=1, the input device 200 generates a signal with frequency f=f1 that corresponds to the input device identification information (ID=1), referring to FIG. 7D. At this time, the touch screen device 100 remembers, from the initial state identification information described above, that the state information of the newly entering input device 200 is color A (black) and that the input device identification information allotted to the input device 200 is ID=1.

Hereinbelow, an operation by the user of changing the state information of the input device 200 during use will be described.

Figure 7E:
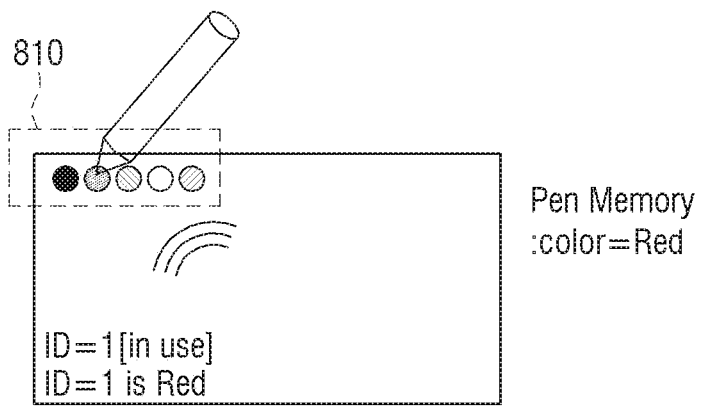

Specifically, referring to FIG. 7E, the touch screen device 100 may display a user interface (UI) (hereinbelow, 'image attribute change UI 810') to change the attributes of the image generated by the input device in one region of the screen.

While displaying such image attribute change UI 810, when a signal associated with the input device identification information is received from the input device 200, the touch screen device 100 determines a location of the corresponding input device 200 based on the received signal.

When determining as a result of determination that the input device 200 is located in a region on which the image attribute change UI 810 is displayed and that image attributes for color B are selected from among a plurality of image attributes included in the image attribute change UI 810, the touch screen device 100 updates from the image attributes for color A that are previously stored in association with the input device 200 to image attributes for color B that are selected through the image attribute change UI 810. The touch screen device 100 then outputs a signal containing information on the image attributes for color B selected through the image attribute change UI 810. Accordingly, when a signal outputted from the touch screen device 100 is received, the input device 200 updates from the preset color A to state information for color B selected through the image attribute change UI 810, based on the information contained in the received signal. That is, the input device 200 may update from the state information for color A pre-stored in the memory (not illustrated) incorporated in the input device 200, to the state information for color B.

Figure 7F:
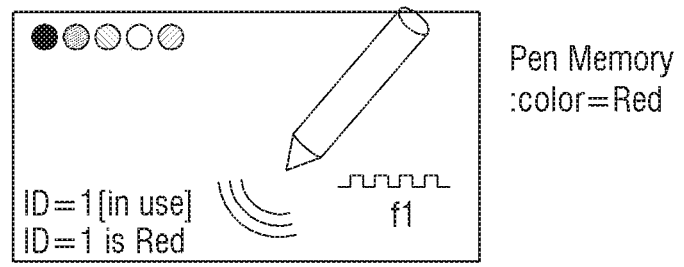

After the image attributes are updated to color B selected through the image attribute change UI 810, when a signal about the input device identification information allotted to the input device 200 is received, referring to FIG. 7F, the touch screen device 100 determines a location of the input device 200 based on the received signal and generate and display an updated image of color B in a region corresponding to the determined location.

Meanwhile, when a certain time is elapsed, it is no longer necessary for both the touch screen device 100 and the input device 200 to maintain the input device identification information. That is, the touch screen device 100 classifies ID=1 to be the non-used input device identification information in order to receive an input from a new input device 200, and the input device 200 also ceases to generate a signal and resets the input device identification information to save power consumption. However, the state information previously stored in the memory (not illustrated) of the input device 200 is still stored in the memory (not illustrated) of the input device 200 even when the input device 200 is not in use. Accordingly, when the non-used input device 200 is used again, an initial state identification signal can be transmitted to the touch screen device 100 based on the state information stored in the memory (not illustrated) of the input device 200.

The touch screen device 100 according to an embodiment has been described above. Hereinbelow, an input device 200 according to an embodiment will be described.

Figure 8:
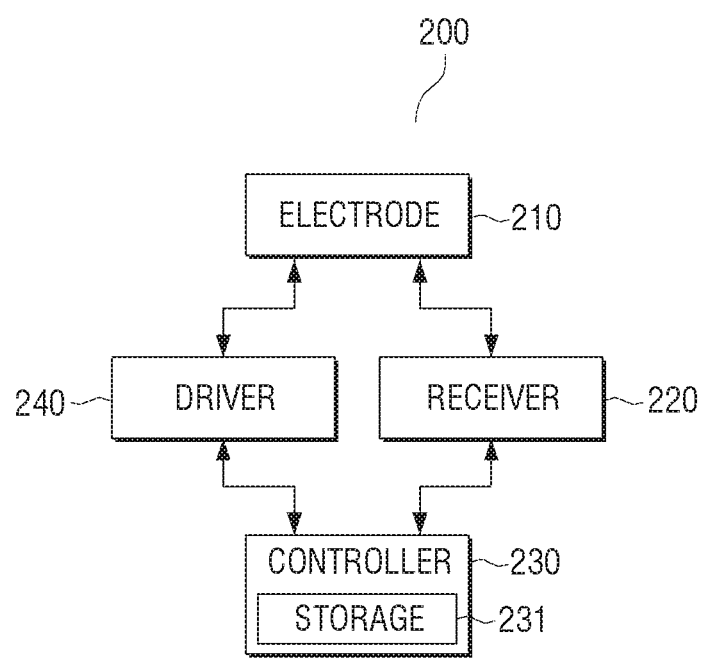
FIG. 8 is a block diagram of an input device according to an embodiment of the present disclosure.

FIG. 8 is a block diagram of an input device according to an embodiment of the present disclosure.

Referring to FIG. 8, an input device 200 includes an electrode unit 210, a receiver 220, a controller 230, and a driver 240. The controller 230 may include a storage 231. However, the present disclosure is not limited to any specific example only. Accordingly, the storage 130 may be implemented as an independent hardware configuration within the touch screen device 100.

The electrode unit 210 serves to transmit and receive a signal by capacitive coupling with a plurality of electrodes of the touch screen device 100.

The receiver 220 receives a wakeup-associated drive signal from the touch screen device 100. Additionally, the receiver 220 receives a signal containing input device identification information from the touch screen device 100. Further, a signal for image attribute-associated state information may also be received.

The driver 240 generates a signal and sends this to the touch screen device 100 through the electrode unit 210. According to an embodiment, the driver 240 may be implemented as a driving circuit and it is possible to generate a signal to send to the touch screen device 100 through such driving circuit. The driver 240 will not be redundantly described herein, as this is already well known in the art pertaining to input device such as stylus pen.

The controller 230 controls the overall operation of the respective components of the input device 200.

Specifically, when a signal containing input device identification information is received through the receiver 220, the controller 230 controls the driver 240 such that, after the signal containing the corresponding information is received, a signal associated with the corresponding information is generated within a preset threshold time, and a signal for the image attribute-associated state information is generated after the present threshold time, after which the signal is transmitted to the touch screen device 100.

The input device identification information received from the touch screen device 100 may be the information allotted to the input devices 200 based on the order the input devices 200 are contacted to the touch screen device 100. Further, as described above, the state information may be the image attribute-associated information for generating an image that corresponds to a touch input of the input device 200.

Specifically, the controller 230 does not generate a signal associated with the input device identification information allotted from the touch screen device 100, without a contact with the touch screen device 100 within the preset threshold time. According to an embodiment, when the intensity of the drive signal received from the touch screen device 100 is below a threshold intensity within a preset threshold time, or when the corresponding drive signal is not received within the preset threshold time, the controller 230 may determine that the touch screen device 100 is not contacted. In this case, the controller 230 resets the input device identification information allotted from the touch screen device 100. As a result, the controller 230 may not generate a signal associated with the input device identification information allotted from the touch screen device 100.

Meanwhile, when the touch screen device 100 is contacted after the preset threshold time, the controller 230 controls the driver 240 to generate a signal for the image attribute-associated state information for generating an image.

As described above, when the input device 200 is not contacted with the touch screen device 100 within the preset threshold time, the controller 230 resets the input device identification information allotted from the touch screen device 100. Accordingly, while the input device identification information is being reset, when the intensity of the received drive signal is above a preset threshold intensity, the controller 230 determines that the input device 200 is contacted with the touch screen device 100. As a result, the controller 230 may control the driver 240 to generate a signal for the pre-registered image attribute-associated state information.

First, when the input device 200 is a device not registered to the touch screen device 100, the process may be performed in the manner described below.

Specifically, the receiver 220 may receive a drive signal by capacitive coupling between the channel electrode 110-1 and the electrode unit 210 incorporated in the panel 110 of the touch screen device 100. The drive signal may be a wakeup-associated signal to operate the input device 200 in an inactive state such that the input device 200 is operated in active state.

When a wakeup-associated signal is received through the receiver 220, by referring to the storage 231 that stores information about preset image attributes in association with the image generation, the controller 230 controls the driver 240 to generate a predefined signal in association with the corresponding image attributes in the manufacture process. Accordingly, the driver 240 transmits the generated state information-associated signal to the touch screen device 100.

After that, when a signal for the input device identification information allotted from the touch screen device 100 is received through the receiver 220, the controller 230 controls the driver 240 to generate a signal associated with the received input device identification information and transmit the same to the touch screen device 100. In this manner, the touch screen device 100 performs registration process of the input device 200.

According to an embodiment, the storage 231 may store input device identification information corresponding to predefined frequency information, respectively. Accordingly, when a signal for the input device identification information allotted from the touch screen device 100 is received through the receiver 220, the controller 230 may analyze the received signal and extract the input device identification information associated with the analyzed signal from the storage 231.

According to an embodiment, the storage 231 may store input device identification information each corresponding to the predefined pattern information. Accordingly, when a signal for the input device identification information allotted from the touch screen device 100 is received through the receiver 220, the controller 230 may analyze the pattern of the received signal and extract the input device identification information associated with the pattern of the analyzed signal from the storage 231.

According to various embodiments described above, when the input device identification information is extracted, the controller 230 may determine the corresponding input device identification information to be the input device identification information allotted from the touch screen device 100. Accordingly, the controller 230 may generate a signal with the frequency corresponding to the input device identification information and transmit the same to the touch screen device 100.

As described above with reference to examples, when it is determined that the input device identification information corresponding to ID=1 is the input device identification information allotted from the touch screen device 100 based on the signal received from the touch screen device 100, the controller 230 may transmit a signal f=f1 that is the frequency corresponding to the input device identification information (ID=1) to the touch screen device 100.

Meanwhile, when the changed image attribute-associated information is received from the touch screen device 100 through the receiver 220, the state information previously stored in the storage 231 may be updated with the changed image attributes based on the received information.

The input device 200 may have not only the state information updatable by the touch screen device 100, but also the static state information defined during manufacture or by the user. When the input device 200 generates a signal containing the state information and the static state information, the touch screen device 100 is capable of achieving different functions depending on the kinds of the input devices 200 by utilizing not only the information updatable by the touch screen device 100, but also the information such as serial numbers, and so on that can identify the kind of the input devices 200.

Meanwhile, the controller 230 generates random numbers while the input device identification information is not yet allotted from the touch screen device 100. That is, when a specific signal is received in a state that the input device identification information is not received from the touch screen device 100, the controller 230 may control the driver 240 to generate a signal based on the generated random numbers.

At this time, the controller 230 may determine a drive section for the initial state identification signal based on the generated random number and control the driver 240 to generate and transmit an initial state identification signal corresponding to the determined drive section.

Specifically, the controller 230 generates a random number to transmit the initial state identification signal before sending the initial state identification signal to the touch screen device 100. Then when a specific signal is received for the number of times corresponding to the generated random number, the controller 230 may control the driver 240 to generate the initial state identification signal and send the same to the touch screen device 100.

For example, when the generated random number is '3', the controller 230 may generate a preset initial state identification signal according to the timing of receiving a third specific signal and transmit the same to the touch screen device 100.

Accordingly, a plurality of input devices 200 may transmit the initial state identification signal previously set for each of the input devices 200 to the touch screen device 100 at different times, instead of transmitting this preset initial state identification signal to the touch screen device 100 at the same timing. As a result, the touch screen device 100 may allot different input device identification information to the respective input devices 200 based on the initial state identification signal received from the respective input devices 200.

Meanwhile, beside the configurations described above, the input device 200 may additionally include a power supply (not illustrated) for the operations of the respective configurations.

Hereinbelow, a control method for the touch screen device 100 and the input device 200 described above will be explained in detail.

Figure 9:
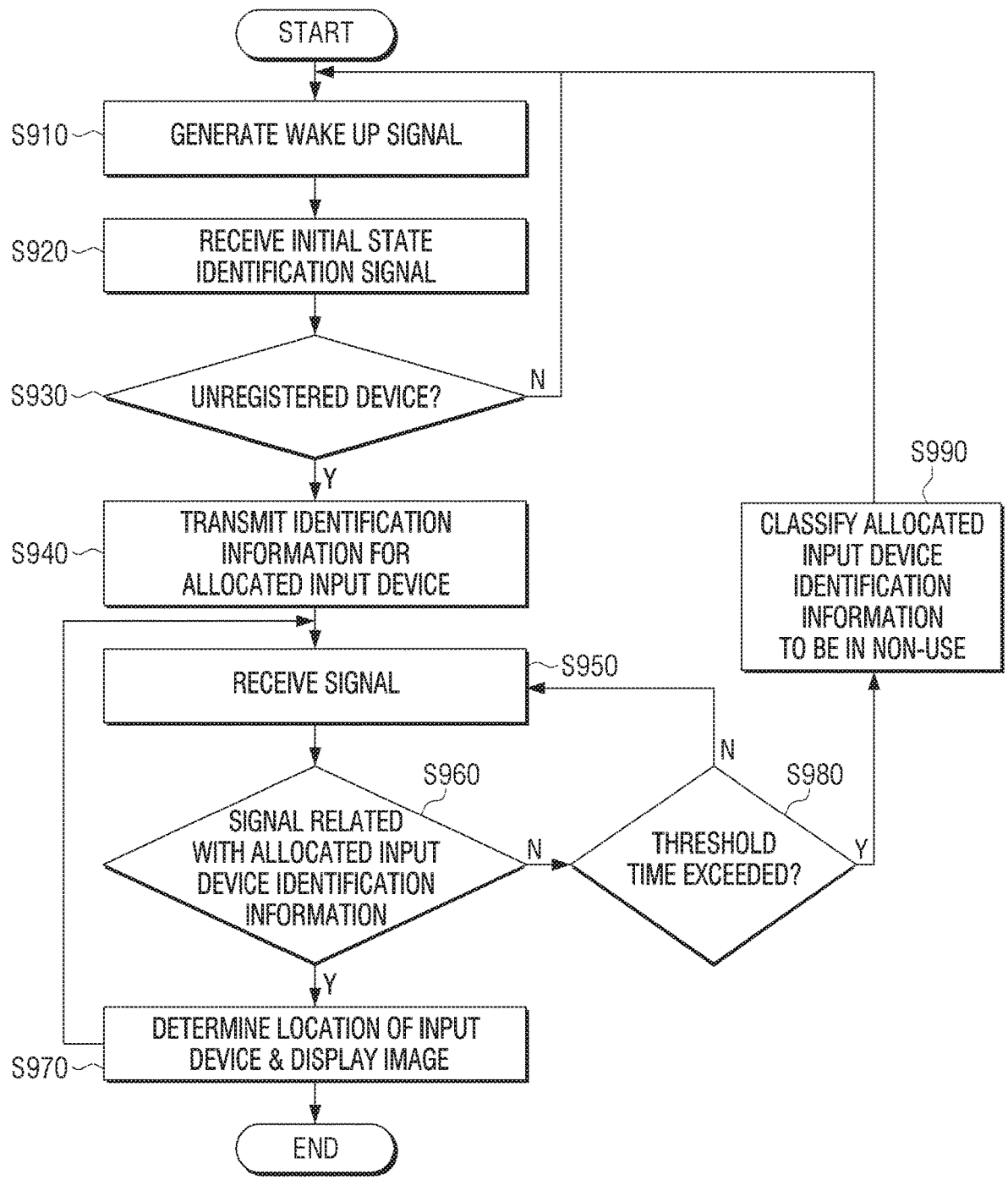
FIG. 9 is a first flowchart of a control method of a touch screen device according to an embodiment of the present disclosure.

FIG. 9 is a first flowchart of a control method for the touch screen device according to an embodiment of the present disclosure.

Referring to FIG. 9, a touch screen device 100 may periodically transmit a wakeup-associated drive signal through the channel electrode 110-1 included in the panel 110, and then receive an initial state identification signal from the input device 200 that is activated by the transmitted drive signal, at operations S910 and S920.

Specifically, when the wakeup-associated drive signal is transmitted, the input device 100 located within a preset threshold distance from the panel 110 of the touch screen device 100 may receive a drive signal applied to at least one electrode by capacitive coupling with at least one of a plurality of electrodes included in the channel electrode 110-1. Accordingly, based on the received drive signal, the input device 200 is changed into active mode, and after being changed into active mode, the input device 200 transmits an initial state identification signal with a certain frequency or pattern that includes the initial state identification information.

According to an embodiment, a signal with 300 kHz frequency may be defined to be the initial state identification information that indicates that the input device 200 is an unregistered one. In this case, the input device 200 transmits 300 kHz signal.

Accordingly, after transmitting the wakeup-associated drive signal, when a signal is received from the input device 200 activated by the transmitted drive signal, the touch screen device 100 analyzes the frequency of the received signal or the pattern of the signal to determine whether or not the input device 200 is unregistered, at operation S930. The unregistered device may be a device that is not allotted with the input device identification information from the touch screen device 100.

As in the case of the example described above, when the input device 200 is an unregistered device, the input device 200 may transmit 300 kHz signal. Accordingly, when a signal with 300 kHz frequency is received, the touch screen device 100 may determine that the input device 200 transmitting the corresponding signal to be the unregistered device.

When determining the input device 100 to be the unregistered device, the touch screen device 100 selects one of a plurality of un-allotted input device identification information and transmit a signal containing the selected input device identification information to the input device 200, at operation S940.

When receiving a signal containing the input device identification information, the input device 200 transmits a signal with a certain frequency or pattern containing the input device identification information allotted to the input device 200, based on the signal received from the touch screen device 100.

According to an embodiment, the input device 200 may store input device identification information corresponding to each of the predefined frequency information or pattern information. Accordingly, when a signal for the input device identification information allotted by the touch screen device 100 is received from the touch screen device 100, the input device 200 analyzes the signal and extracts the input device identification information associated with the analyzed signal among the pre-stored input device identification information. The input device 200 may then determine the extracted input device identification information to be the input device identification information allotted from the touch screen device 100. Accordingly, the controller 230 may generate a signal with the frequency corresponding to the input device identification information and transmit the same to the touch screen device 100.

As described above with reference to an example, when the input device identification information corresponding to ID=2 is determined to be the input device identification information allotted from the touch screen device 100 based on the signal received from the touch screen device 100, the controller 230 may transmit f=f1 signal with the frequency corresponding to input device identification information (ID=1) to the touch screen device 100.

For example, when the input device identification information corresponding to ID=1 is determined to be the input device identification information allotted from the touch screen device, the input device 200 may transmit f=f1 signal with the frequency corresponding to the input device identification information (ID=1). In another example, the input device 200 may transmit a signal pattern that contains digital code representing the input device identification information corresponding to ID=1.

When a signal containing such input device identification information is received, the touch screen device 100 analyzes the frequency of the received signal or the pattern of the received signal and determines whether the signal is associated with the input device identification information allotted to the input device 200 or not, at operations S950 and S960.

When determining as a result of determination that the received signal is the signal associated with the input device identification information allotted to the device 200, the touch screen device 100 determines a location of the input device 200 approaching or contacting the panel 110, generates an image at the determined location, and displays the same, at operation S970.

Meanwhile, when determining that the signal received at operation S960 described above is not associated with the allotted input device identification information, the touch screen device 100 determines whether or not a signal containing the input device identification information is received from the input device 200 within a preset threshold time, at operation S980. When determining that the signal is not received from the input device 200 allotting the input device identification information for the preset threshold time, the touch screen device 100 classifies the input device identification information allotted to the input device 200 to be the non-used identification information, at operation S990. Accordingly, the input device identification information allotted to the input device 200 may be classified into un-allotted identification information.

Figure 10:
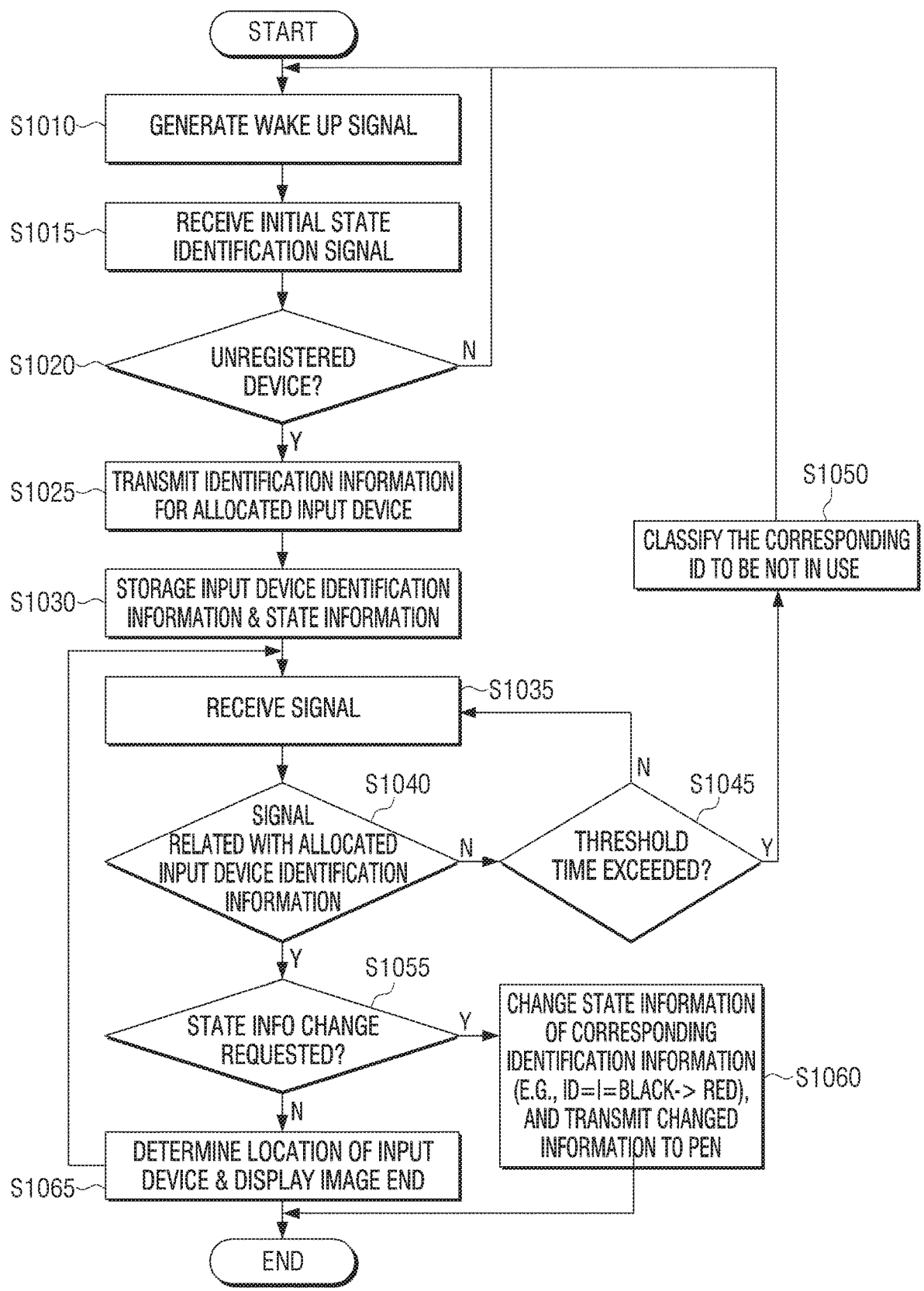
FIG. 10 is a second flowchart of a control method of a touch screen device according to an embodiment of the present disclosure.

FIG. 10 is a second flowchart of a control method of a touch screen device according to an embodiment of the present disclosure.

Referring to FIG. 10, the touch screen device 100 periodically transmits a wakeup-associated drive signal through the channel electrode 110-1 included in the panel 110, and then receives an initial state identification signal from the input device 200 that is activated by the transmitted drive signal, at operations S1010 and S1015.

Specifically, when a wakeup-associated drive signal is transmitted, the input device 100 located within a preset threshold distance from the panel 110 of the touch screen device 100 may receive a drive signal applied to at least one electrode by capacitive coupling with at least one of a plurality of electrodes included in the channel electrode 110-1. Accordingly, based on the received drive signal, the input device 200 is changed into active mode and after being changed into active mode, the input device 200 transmits a signal with a certain frequency or pattern containing the initial state identification information. The initial state identification information may include a finally-set image attribute-associated state information.

Specifically, the input device 100 may previously store the state information that indicates image attributes. Accordingly, the input device 200 generates initial state identification information containing the state information indicating pre-stored image attributes and transmits a signal with a certain frequency or pattern that contains the generated initial state identification information.

Accordingly, when the signal transmitted from the input device 200 is received, the touch screen device 100 analyzes the frequency of the received signal or the pattern of the received signal and determines whether or not the input device 200 is an unregistered device, at operation S1020. Meanwhile, when the initial state identification signal contains the initial attribute-associated state information, the touch screen device 100 analyzes the frequency of the received signal or the pattern of the received signal such that when the received signal is determined to be the signal associated with the state information indicating the image attributes, the touch screen device 100 may determine that the input device 200 is the unregistered device.

When determining the input device 200 to be the unregistered device, the touch screen device 100 selects one of a plurality of un-allotted input device identification information and transmits the signal containing the selected input device identification information to the input device 200, at operation S1025. The touch screen device 100 may then match and store the input device identification information allotted to the input device 200 and the state information of the input device 200, at operation S1030.

Meanwhile, when receiving a signal containing the input device identification information, the input device 200 transmits a signal having a certain frequency or pattern containing the input device identification information allotted to the input device 200, based on the signal received from the touch screen device 100. When receiving the signal containing the input device identification information, the touch screen device 100 analyzes the frequency of the received signal or the pattern of the received signal and determines whether or not the received signal is associated with the input device identification information allotted to the input device 200, at operations S1035 and S1040.

When determining that the received signal is not associated with the allotted input device identification information, the touch screen device 100 determines whether or not a signal containing input device identification information is received from the input device 2, within a preset threshold time, at operation S1045.

When determining that a signal associated with the input device identification information allotted to the input device 200 is not received within the preset threshold time, the touch screen device 100 classifies the input device identification information allotted to the input device 200 to be the non-used identification information, at operation S1050. Accordingly, the input device identification information allotted to the input device 200 may be classified to be the un-allotted identification information.

Meanwhile, when determining the signal received at operation S1040 described above to be the signal associated with the input device identification information allotted to the input device 200, the touch screen device 100 determines whether or not the location at which the input device 200 is contacting or approaching, contact pressure, and so on correspond to a request associated with change of states for the purpose of changing image attributes, at operation S1055. When determining the request to be associated with the state changing, the touch screen device 200 updates the state information previously stored in association with the input device 200 with the received state information, and outputs a signal containing the updated state information, at operation S1060.

Accordingly, when a signal outputted from the touch screen device 100 is received, the input device 200 may update the preset image attribute-associated state information with the state information contained in the received signal.

Specifically, the touch screen device 100 may display a UI to change attributes of an image being generated by an input device on one region of the screen. When a signal associated with the input device identification information is received from the input device 200, the touch screen device 100 determines a location of the input device 200 based on the received signal. When determining that the input device 200 is located in a region where the image attribute change UI is displayed, and when determining that the image attributes for color B is selected from among a plurality of image attributes included in the image attribute change UI, the touch screen device 100 updates from the pre-stored color A image attributes into image attributes for color B selected through the image attribute change UI 810. The touch screen device 100 then outputs a signal containing information about the image attributes for color B selected through the image attribute change UI 810.

When the signal outputted from the touch screen device 100 is received, the input device 200 updates the image attribute information from the preset color A into color B selected through the image attribute change UI, based on the information contained in the received signal.

Meanwhile, when determining that the signal associated with state change is not received at operation S1055 described above, the touch screen device 100 determines a location of the input device 200 approaching or contacting the panel 110 and generates and displays an image at the determined location, at operation S1065.

Figure 11:
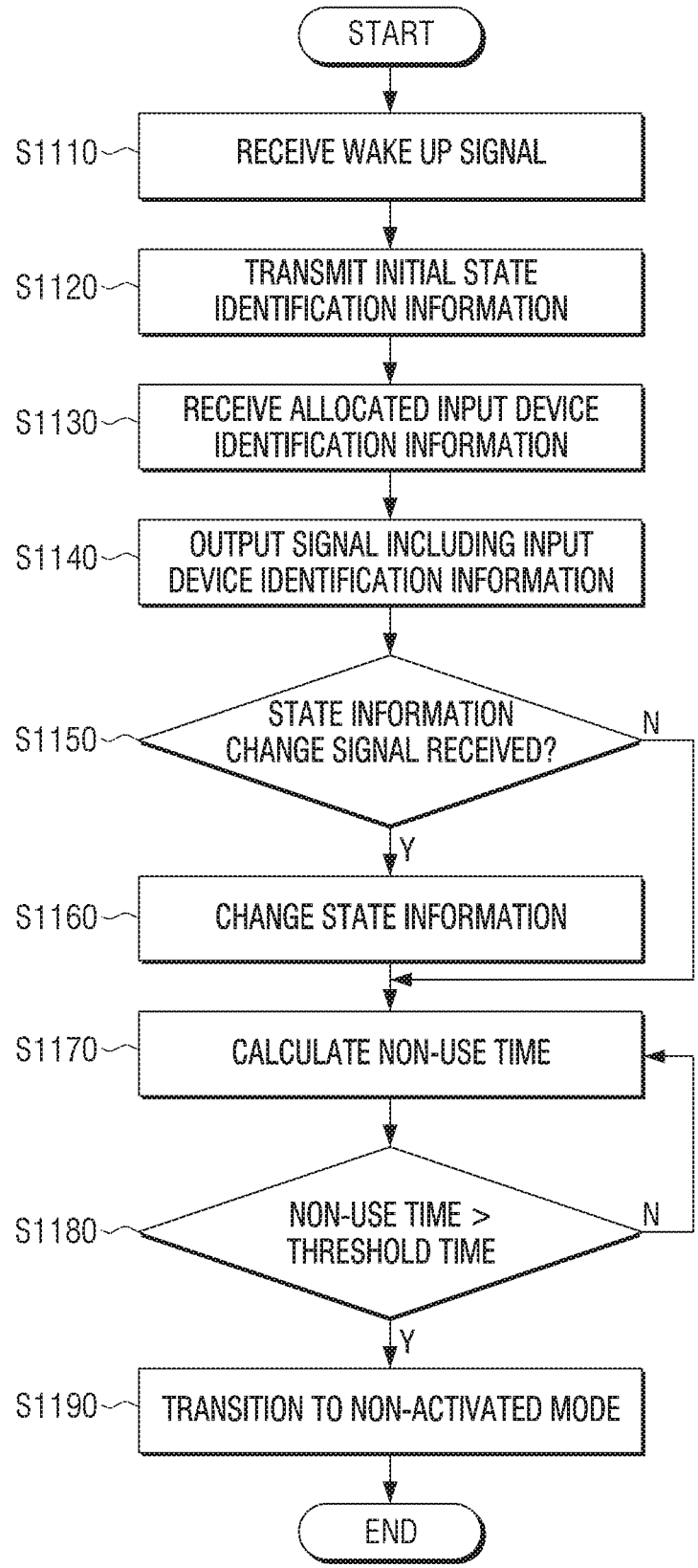
FIG. 11 is a flowchart of a control method of an input device according to an embodiment of the present disclosure.

FIG. 11 is a flowchart of a control method of an input device according to an embodiment of the present disclosure.

Referring to FIG. 11, the input device 200 receives a drive signal applied from the touch screen device 100 by the capacitive coupling between at least one electrode included in the panel 110 of the touch screen device 100 and the electrode unit included in the input device 200, at operation S1110. The drive signal may be a wakeup-associated signal to operate the input device 200 in inactive state such that the input device 200 is operated in active state.

When such drive signal is received, the input device 200 transmits the initial state identification signal to the touch screen device 100, at operation S1120. The initial state identification signal may include image attribute-associated state information generated by the input device 200.

According to an embodiment, when the input device 200 is a device not registered to the touch screen device 100, the input device 200 generates an initial state identification signal and transmits the same to the touch screen device 100. The unregistered device may be the device that is not allotted with the input device identification information from the touch screen device 100.

The input device 200 may generate an initial state identification signal and transmits the same to the touch screen device 100 according to the various embodiments described below.

According to an embodiment, when a certain signal is received from the touch screen device 100 while the input device 200 is not being allotted with the input device identification information, the input device 200 generates a random number. The input device 200 may then generate an initial state identification signal based on the generated random number.

That is, when a certain signal is received from the touch screen device 100, the input device 200 may generate a random number and generate an initial state identification signal based on the number of times the certain signal is received and the previously generated random number.

That is, the input device 200 may determine a drive section of the initial state identification signal based on the generated random number and transmit the corresponding initial identification signal within the determined drive section to the touch screen device 100. The input device 200 then receives the input device identification information allotted from the touch screen device 100, at operation S1130.

Accordingly, the input device 200 generates a signal containing the input device identification information allotted from the touch screen device 100 based on the signal for the input device identification information received from the touch screen device 100, and outputs the same, at operation S1140. As a result, the touch screen device 100 can determine the location of the input device 200 based on the signal outputted from the input device 200.

Meanwhile, after the input device identification information is allotted, when a signal for change of the image attribute-associated state information is received from the touch screen device 100, the input device updates the preset image attribute-associated state information based on the received signal, at operations S1150 and S1160.

Meanwhile, after outputting a signal containing input device identification information as in the case of operation S1140 described above, or after updating the image attribute-associated state information as in the case of operation S1160, the input device 200 calculates non-use time of the input device 200 at operation 1170. The input device 200 then compares the calculated non-use time with the preset threshold time such that when the non-use time exceeds the preset threshold time, the input device 200 is changed into inactive mode for the power saving purpose, at operations S1180 and S1190.

Specifically, when a distance between the input device 200 and the touch screen device 100 is above the preset threshold distance, the input device 200 does not transmit or receive a signal with the touch screen device 100.

According to an embodiment, when the distance between the input device 200 and the touch screen device 100 is above the preset threshold distance, the intensity of the drive signal transmitted from the touch screen device 100 and received at the input device 200 may be below a preset threshold intensity. Accordingly, the input device 200 may determine how distant the input device 200 and the touch screen device 100 are away from each other, based on the intensity of the drive signal received from the touch screen device 100.

According to the embodiment, when the distance between the input device 200 and the touch screen device 100 is above the present threshold distance, the input device 200 does not transmit or receive the signal with the touch screen device 100.

Accordingly, the input device 200 calculates non-use time based on a time difference between when a signal is received from the touch screen device 100 (or when a signal is outputted to the touch screen device 100), and when another signal is received (or outputted). The input device 200 then compares the calculated non-use time with the preset threshold time such that when the calculated non-use time is exceeded, the input device 200 is changed into inactive mode. In one example, the input device 200 may reset the input device identification information allotted from the touch screen device 100 before being changed into the inactive mode and then changed into the inactive mode.

While being changed into the inactive mode, when a wakeup-associated drive signal outputted from the touch screen device 100 is received, the input device 200 may again perform a series of operations described above.

Meanwhile, the control methods for the touch screen device 100 and the input device 200 described above may be implemented as at least one executive program and such executive program may be stored on a non-transitory computer readable medium.

The non-transitory readable medium refers to a medium that is capable of storing data semi-permanently rather than storing the data for the short period of time like register, cache, memory, and so on, and that is machine-readable. Specifically, the programs mentioned above may be stored on a variety of types of recording media that are readable on a terminal, such as RAM, flash memory, ROM, erasable programmable ROM (EPROM), electronically erasable and programmable ROM (EEPROM), register, hard disk, removable disk, memory card, universal serial bus (USB) memory, compact disc ROM (CD-ROM), and so on.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch screen device, comprising: a channel electrode; a driver circuit; a receiver circuit; and a processor configured to: transmit a first signal including an input device identification information by a capacitive coupling to at least one input device using the driver circuit and the channel electrode, wherein the input device identification information is differently assigned to each of the at least one input device, receive a second signal from a first input device among the at least one input device using the channel electrode and the receiver circuit, analyze at least one of a frequency or a pattern of the second signal to determine whether the second signal is associated with the input device identification information assigned to the first input device, identify whether the first input device is registered to provide input for the touch screen device based on the analyzed result, and based on the first input device is-being registered, determine a location of the first input device based on the second signal.

2. The touch screen device of claim 1, wherein the processor is further configured to transmit the first signal when the at least one input device contacts the touch screen device.

3. The touch screen device of claim 1, further comprising:
a storage configured to store an initial state identification information, an assigned input device identification information, and an unassigned input device identification information from among a plurality of the input device identification information that includes at least one of frequency information or digital code information,
wherein, when a second input device among the at least one input device is not registered, the processor is further configured to transmit one of the unassigned input device identification information to the second input device using the driver circuit and the channel electrode.

4. The touch screen device of claim 3, wherein, when the second signal is not received within a preset threshold time, from the first input device, the processor is further configured to classify the input device identification information as not in use.

5. The touch screen device of claim 1, wherein the processor is further configured to transmit state information to the first input device using the driver circuit and the channel electrode, the state information including the input device identification information and an attribute-associated information of an image being generated by the first input device.

6. A method of a touch screen device, the method comprising: transmitting a first signal including an input device identification information to an input device by a capacitive coupling to at least one input device using a driver circuit and a channel electrode, wherein the input device identification information is differently assigned to each of the at least one input device; receiving a second signal from a first input device among the at least one input device using the channel electrode and a receiver circuit; analyzing at least one of a frequency or a pattern of the second signal to determine whether the second signal is associated with the input device identification information assigned to the first input device; identifying whether the first input device is registered to provide input for the touch screen device based on the analyzed result; and based on the input device being registered, determining a location of the first input device based on the second signal.

7. The method of claim 6, wherein the first signal is transmitted to the at least one input device when the at least one input device contacts the touch screen device.

8. The method of claim 6, further comprising:
storing, by the touch screen device, an initial state identification information, an assigned input device identification information, and an unassigned input device identification information from among a plurality of input device identification information that includes at least one of frequency information or digital code information;
determining whether the second signal is associated with the input device identification information assigned to the first input device based on the stored information; and
transmitting one of the unassigned input device identification information to the input device when the first signal corresponds to the initial state identification information.

9. The method of claim 8, further comprising, when the second signal is not received, within a preset threshold time, from the first input device to which the input device identification information is transmitted, classifying the input device identification information as not in use.

10. The method of claim 6, further comprising transmitting state information to the input device, the state information including the input device identification information and an image attribute-associated information of an image being generated by the first input device.

11. An input device comprising:
an electrode unit;
a driver circuit;
a receiver circuit; and
a processor configured to:
receive a first signal including input device identification information from a touch screen device using the electrode unit and the receiver circuit,
determine whether a second signal is received within a preset threshold time after the first signal,
when the second signal is received within the preset threshold time, generate a third signal based on the input device identification information and transmit the third signal using the driver circuit and the electrode unit, and
when the second signal is not received within the preset threshold time, generate a fourth signal associated with first state information including attributes of an image being generated by the input device and transmit the fourth signal using the driver circuit and the electrode unit,
wherein the first signal includes a specific frequency or a specific pattern for activating the input device, which is in an inactivated state.

12. The input device of claim 11, wherein the input device identification information is generated when the input device contacts the touch screen device.

13. The input device of claim 11, further comprising:
a storage configured to store the first state information,
wherein, when a second state information is received from the touch screen device, the processor is further configured to update the first state information based on the second state information.

14. The input device of claim 13, wherein the driver circuit is further configured to generate the first state information and static state information that is not changed by the touch screen device.

15. An input device, comprising:
a driver circuit;
a receiver circuit; and
a processor configured to:
while the input device is in an inactivated state, receive a first signal by a capacitive coupling from a touch screen device using the receiver circuit, and
when a second signal including input device identification information is not received from the touch screen device using the receiver circuit, control the driver circuit to generate a random number and a third signal based on the random number, and
transmit the third signal to the touch screen device.

16. The input device of claim 15, wherein the first signal includes a specific frequency or a specific pattern in relation to wake-up for activating the input device.

17. The input device of claim 15, wherein the processor is further configured to:
control the driver circuit to determine a drive section of the third signal based on the random number, and when the second signal including the input device identification information is received from the touch screen device, generate a fourth signal associated with the input device identification information.

18. The input device of claim 15, wherein the processor is further configured to control the driver circuit to generate the third signal based on a number of times of the first signal is received and the random number.

19. A method of an input device, the method comprising:
receiving an input device identification information from a touch screen device; and
generating a first signal based on the input device identification information and transmitting the first signal to the touch screen device,
wherein the transmitting comprises:
when a driving signal from the touch screen device is received within a predetermined threshold time after receiving the input device identification information, generating a signal associated with the input device identification information, and
when the driving signal from the touch screen device is not received within the predetermined threshold time after receiving the input device identification information, generating a signal associated with state information including attributes of an image being generated by the input device, and
wherein the driving signal includes a specific frequency or a specific pattern in relation to wake-up for activating the input device, which is in an inactivated state.

20. The method of claim 19, wherein the input device identification information is generated when the input device contacts the touch screen device.

21. The method of claim 19, the method comprising:
receiving the signal including the state information from the touch screen device; and
updating pre-stored state information based on the state information included in the signal.

22. A method of an input device, the method comprising:
while the input device is in an inactivated state, receiving a first signal by a capacitive coupling from a touch screen device;
when a second signal including input device identification information is not received from the touch screen device, generating a random number and a third signal based on the random number; and
transmitting the second signal to the touch screen device.

23. The method of claim 22, the method further comprising:
when the second signal is not received from the touch screen device, determining a drive section for the third signal based on the random number,
wherein the generating of the second signal comprises:
generating initial state identification information in the drive section, and
when the second signal is received from the touch screen device, generating a fourth signal related to the input device identification information.

24. The method of claim 22, wherein the third signal is generated based on a number of times of the first signal is received and the random number.

* * * * *